(12) United States Patent
Trentacosta et al.

(10) Patent No.: US 7,597,855 B2
(45) Date of Patent: Oct. 6, 2009

(54) ADAPTIVE MEMBRANE STRUCTURE

(75) Inventors: Joseph D. Trentacosta, Wilmington, DE (US); Vivek Kapur, Kennett Square, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 776 days.

(21) Appl. No.: 11/118,961

(22) Filed: Apr. 29, 2005

(65) Prior Publication Data
US 2005/0249917 A1 Nov. 10, 2005

Related U.S. Application Data

(60) Provisional application No. 60/567,357, filed on Apr. 30, 2004.

(51) Int. Cl.
*A41D 13/00* (2006.01)
(52) U.S. Cl. .................. 422/119; 422/50; 422/68.1; 422/83; 436/3; 436/104; 2/457; 251/129.01
(58) Field of Classification Search .............. 422/119, 422/50, 68.1, 83; 436/3, 104; 2/457; 251/129.01
See application file for complete search history.

(56) References Cited

U.S. PATENT DOCUMENTS

| 1,243,122 | A | 10/1917 | Winters |
| 4,194,041 | A | 3/1980 | Gore et al. |
| 4,455,187 | A | 6/1984 | Von Bliicher et al. |
| 4,515,761 | A | 5/1985 | Plotzker |
| 4,538,642 | A | 9/1985 | Schutten et al. |
| 4,772,510 | A | 9/1988 | McClure |
| 4,833,010 | A | 5/1989 | Langley |
| 4,855,178 | A | 8/1989 | Langley |
| 4,914,752 | A * | 4/1990 | Hinson et al. .................. 2/458 |
| 5,161,774 | A * | 11/1992 | Engelsdorf et al. ............ 251/11 |
| 5,260,360 | A | 11/1993 | Mrozinski et al. |
| 5,273,814 | A | 12/1993 | Kelly |
| 5,375,813 | A * | 12/1994 | Rozinsky .................... 251/333 |
| 5,626,947 | A | 5/1997 | Hauer et al. |
| 6,418,968 | B1 * | 7/2002 | Pezzuto et al. .............. 137/833 |
| 6,579,948 | B1 | 6/2003 | Tan et al. |
| 2002/0027101 | A1 * | 3/2002 | Insley et al. ................. 210/488 |

OTHER PUBLICATIONS

Baker et al., Membrane Technology, Encyclopedia of Polymer Science and Technology, 3rd Edition, pp. 184-248, 2003.

* cited by examiner

*Primary Examiner*—Lyle A Alexander
(74) *Attorney, Agent, or Firm*—Gail D. Tanzer

(57) ABSTRACT

The present invention relates to a porous adaptive membrane structure that has movable membranes. The structure can be made to change its gas, liquid or particulate permeability in response to surrounding environmental conditions. The application of this invention is includes protective apparel that is comfortable to wear wherein the level of protection provided is based on conditions in the environment. Hence, the protective apparel is highly breathable and comfortable in a non-hazardous environment but impermeable or only semi-permeable in a hazardous environment.

20 Claims, 19 Drawing Sheets

SECTION X-X

ADAPTIVE MEMBRANE STRUCTURE

This application claims the benefit of U.S. Provisional Application No. 60/567,357, filed Apr. 30, 2004, which is incorporated in its entirety as a part hereof for all purposes.

FIELD OF THE INVENTION

The present invention relates to an adaptive membrane structure that has movable membranes. In one embodiment, the structure can be made to change its liquid or vapor permeability in response to surrounding environmental conditions. The application of this invention includes an article such as protective apparel that is comfortable to wear wherein the level of protection provided is based on conditions in the environment. Hence, the protective apparel is highly breathable and comfortable in a non-hazardous environment but semipermeable or impermeable in a hazardous environment.

TECHNICAL BACKGROUND OF THE INVENTION

There is a growing need for personal protective apparel that guards against toxic chemical and biological agents. These agents may be
  (a) accidentally released in a chemical manufacturing plant, in a scientific or medical laboratory or in a hospital;
  (b) released intentionally during wartime by a government to attack the military forces of the opposition; or
  (c) released during peacetime by criminal or terrorist organizations with the purpose of creating mayhem, fear and widespread destruction.

For this reason, the United States military and other defense organizations of countries all over the world have sought to provide adequate protection against chemical and biological warfare agents. The need for such protective apparel also extends to police departments, fire departments, emergency responders and health care providers. These organizations are responsible for providing assistance and relief after a catastrophic release of chemical or biological toxins, but they cannot discharge their responsibilities without adequate protection ("Chemical Protective Clothing for Law Enforcement Patrol Officers and Emergency Medical Services when Responding to Terrorism with Chemical Weapons", Arca, V. J. and Marshall, S. M., in report of the Chemical Weapons, Improved Response Program, U.S. Army Soldier and Biological Chemical Command, November 1999).

According to the *Handbook of Chemical and Biological Warfare Agents* (D. Hank Ellison, CRC Press, Boca Raton, Fla., 1st edition, 1999), most chemical warfare toxins are fatal at concentrations as low as 1 part per million (ppm). Hence, to provide adequate protection from chemical warfare agents, a protective suit has to be almost impermeable to such chemicals. It is not difficult to devise structures that are impermeable to toxic chemical vapors and liquids, but such structures are also hot, heavy and uncomfortable to wear. The degree of comfort offered by a protective suit is largely determined by the amount of water vapor that can permeate through the protective fabric. The human body continuously perspires water vapor as a method for controlling body temperature. When a protective fabric hinders the loss of water vapor from the body, the transpirational cooling process is hindered, which leads to personal discomfort. When a protective suit allows little or no loss of water vapor, extreme heat stress or heat stroke can result in a short period of time. Hence, in addition to offering the highest levels of protection against toxic chemicals and liquids, a practical chemical and biological protective suit must have high water vapor transmission rates. The appropriate protective structure must also be light in weight and offer the same high level of protection over a long period of time.

There is a large variety of protective apparel available in the market today. The garments that offer the highest levels of comfort (high water vapor transmission rates) offer little or no protection against chemical and biological hazards, while those that offer the highest levels of protection against toxic hazards are also typically impermeable to water vapor. For example, garments made from woven fabrics are very breathable and comfortable to wear but offer no protection from noxious agents. Nonwoven fabrics such as those sold under the trade name of Tyvek® spunbonded olefin (available from DuPont, Wilmington, Del.) offer protection from particulate agents but offer little protection against chemical liquids and vapors. These nonwoven fabrics are also less permeable to water vapor than woven fabrics made from natural or man-made fibers. Protective suits made from multiple layers of laminated polymer films offer high level of protection against both liquid and vapor agents but are also largely impermeable to water vapor. Such impermeable suits may require a Self Contained Breathing Apparatus (SCBA) to provide comfort to the individual wearing the protective suit.

Considerable effort has been expended in creating laminated multilayered film structures for chemical protective apparel. Each layer in the laminated structure is chosen to impart certain features to the apparel. Some layers provide strength, while others provide resistance to specific classes of chemicals. Such laminated structures may be characterized as passive structures because the barrier layers physically impede the motion of the toxic chemicals without necessarily interacting or reacting with the permeating chemical species. U.S. Pat. No. 4,772,510 (Mc Clure), U.S. Pat. No. 4,833,010 (Langley), U.S. Pat. No. 4,855,178 (Langley) and U.S. Pat. No. 5,626,947 (Hauer) describe various laminated structures consisting of one or more chemical barrier layers. Such laminated films significantly hinder the permeation of chemicals, but they also prevent transport of water vapor. Hence, apparel made from such multilayered films is exceedingly uncomfortable to wear.

Another example of a passive protective layer in apparel is the use of microporous membranes. The preparation and characteristics of microporous membranes are well known in the art—see, for example, Richard W. Baker, "Membrane Technology", in *Encyclopedia of Polymer Science and Technology*, 3rd Edition, John Wiley & Sons, Hoboken, N.J., 2003, pages 184-248. Such membranes, depending on the pore size and the surface functionality of the pores, may provide protection against specific classes of liquid chemicals. Also, because of the porous structure, the membrane layer is more breathable and comfortable to wear than non-porous, multilayered laminated structures. U.S. Pat. No. 4,194,041 (Gore) describes the use of a hydrophobic microporous membrane made from either polytetrafluoroethylene or polypropylene in conjunction with a hydrophilic polymer layer as a water barrier. U.S. Pat. No. 5,260,360 (Mrozinski) describes a microporous membrane made from a polyolefin and a fluorochemical oxazolidinone. However, because the diameter of pores in such membranes typically ranges from 0.1 to 10 micrometers, the resulting structure cannot offer much protection against chemical vapors.

Research effort has also been directed towards creating protective apparel that is "reactive" in nature. The protective garment is made reactive by encapsulating certain chemical species into the garment that can absorb, adsorb or chemically react with toxic chemical vapors as they diffuse through the garment. Such reactive garments are usually made up of multiple layers wherein at least one layer comprises an encapsulated reactant, and at least one outer layer consists of an air permeable layer. U.S. Pat. No. 4,455,187 (von Blucher) describes the art of creating reactive garments by encapsulating the reactive species in an appropriate polymer and depositing the resulting solids onto a porous fabric. The reactive species suggested in the invention are silica xerogels, powdered metal oxides and hydroxides, molecular sieves, ion exchangers and various forms of activated carbon. U.S. Pat. No. 5,273,814 (Kelly) describes an improved reactive structure for chemical protection. The improvement is brought about by the use of a hydrophobic microporous membrane layer in conjunction with an activated carbon layer. The purpose of the microporous membrane is to provide protection from liquid chemicals and to protect the reactive layer from being inundated and poisoned by liquid chemicals. One of the major limitations of reactive garments is that they have a limited effective lifetime. This is because the reactive agents such as activated carbon do not just react with toxic chemical agents but can be poisoned by many different impurities in the environment. Thus, the level of protection offered by such reactive garments decreases with time. Also, reactive suits that rely on solid reactants such as activated carbon have significant weight and are therefore cumbersome to wear over long time periods.

Hazardous materials ("hazmat") protective garments may also be created from semi-permeable or semi-selective polymer membranes. Such membranes are nonporous continuous polymer films usually prepared from polymer electrolytes and ion exchange polymers. Such selective membranes offer significant barrier to the permeation of chemical agents but still allow for the permeation of water vapor. U.S. Pat. No. 4,515,761 (Plotzker) describes the art of creating a composite protective fabric from a semipermeable polymer membrane, which is prepared from a highly fluorinated ion exchange polymer containing sulfonic acid metal ion salt functional groups. U.S. Pat. No. 6,579,948 (Tan) describes a method for creating protective semipermeable membranes from block copolymers of polystyrene and isobutylene, where a fraction of the styrene segments have been sulfonated to form sulfonic acid groups. The ionic content of the polymer allows for a greater transmission of water vapor than is possible for membranes made from non-sulfonated styrene block copolymers.

There are two major problems with all the protective garments described in prior art. First, all existing protective garments offer the same constant level of protection at all times. In most situations, the wearer of a protective garment does not require protection from the environment at all times. Protection is only needed when a toxic chemical or biological agent is present in the environment. Second, none of the garments described in the art offer an optimum balance of protection and comfort. In all cases described so far, either comfort is sacrificed at the expense of protection or vice versa. The object of this invention is to overcome the aforementioned problems using a membrane structure having movable membranes, one advantage of which is a variable and controllable permeability.

SUMMARY OF THE INVENTION

It is an object of this invention to provide an adaptive membrane structure that includes first and second membranes, and means to respond to an actuating stimulus that moves the first membrane into contact with the second membrane in a position in which the permeability of the structure to gas, vapor, liquid and/or particulates is decreased.

Another object of this invention is to provide physical assets and devices fabricated from or incorporating an adaptive membrane structure as described above including an article of apparel, an enclosure for the occupancy of humans, animals or a valve for controlling the flow of gas, vapor, liquid and/or particulates.

It is a further object of this invention to provide an adaptive membrane structure that includes first and second membranes having holes, and means to respond to an actuating stimulus that moves the first membrane into contact with the second membrane in a position in which the holes of the first membrane are substantially out of registration, or are out of registration, with the holes of the second membrane.

Yet another object of this invention is to provide an adaptive membrane structure that includes first and second membranes having holes, and means to respond to an actuating stimulus that moves one or more portions of the first membrane into contact with a corresponding portion or portions of the second membrane in a position in which the holes of each portion of the first membrane are substantially out of registration, or are out of registration, with the holes of the corresponding portion of the second membrane.

Yet another object of this invention is to provide an adaptive membrane structure that includes first and second movable membranes, and means to respond to an electrical force, a magnetic force, a hydrodynamic force or a hydrostatic force.

Yet another object of this invention is to provide, in a membrane structure comprising first and second movable membranes, a method for moving the first membrane toward the second membrane by applying an electrical force, a magnetic force, a hydrodynamic force or a hydrostatic force to the first membrane.

Yet another object of this invention is to provide a method for controlling the flow of gas, vapor, liquid and/or particulates through first and second membranes having holes, by (a) providing the holes in each membrane in a position in which, when the membranes are in contact with each other, the holes are substantially out of registration, or are out of registration, and (b) moving the membranes into contact with each other.

Yet another object of this invention is to provide an adaptive membrane structure that includes first and second movable membranes having holes, and a spacer located between the membranes that does not block any hole. Further included, if desired, may be means for deforming one of the membranes to move it into contact with the other membrane.

Yet another object of this invention is to provide an adaptive membrane structure that includes first and second movable membranes, means to respond to an actuating stimulus that moves the first membrane into contact with the second membrane, and a sensor that activates the actuating stimulus.

The invention also provides a process for fabricating adaptive membrane structures.

Other objects and advantageous technical effects offered by this invention are more fully described below.

DETAILED DESCRIPTION OF THE INVENTION

Figure 1A:
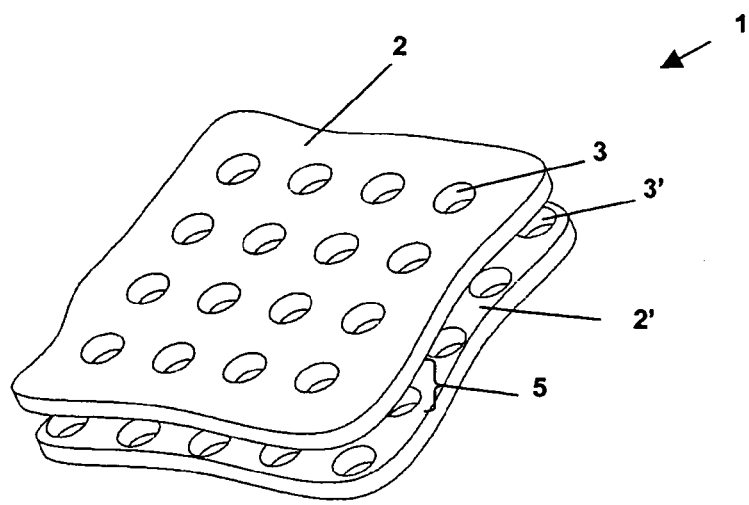
FIG. 1 is a schematic diagram of an unactuated adaptive membrane structure, indicating high permeability. (1A: perspective view. 1B: plan view. 1C: sectional view.)

One important object of this invention is to overcome the aforementioned limitations of protective garments and other protective structures by providing an adaptive membrane structure. An "adaptive membrane structure" is a structure comprising at least two membranes wherein the membranes are movable upon the activation or application of an actuating stimulus such as a force. The membrane structure is thus "adaptive" in the sense that the permeability of the structure can be changed based on the conditions in the external environment.

A "membrane" as used in this invention is a discrete, thin structure that moderates the transport of species in contact with it, such as gas, vapor, aerosol, liquid and/or particulates. Examples of membranes include without limitation film, plastic sheeting, synthetic barriers, layers, laminar structures, woven fabric, and nonwoven sheet. A membrane may be chemically or physically homogeneous or heterogeneous. A "microporous membrane" is a membrane typically containing pores in the range of 0.1 to 10 micrometers in diameter. Microporous membranes are typically characterized by the fraction of total membrane volume that is porous (i.e. relating to porosity), a term reflecting the average pore length within the membrane compared with membrane thickness (i.e. relating to tortuosity), and average pore diameter. The term "pore" as used herein denotes an opening that exists in a membrane that may or may not completely traverse the membrane. Typically, the pore size, the pore shape and/or the pore placement is not well defined or controlled, though there may be a relatively reproducible average pore size and/or pore size distribution.

The membranes used in the structure of this invention typically have holes as distinguished from pores, a "hole" being an opening that completely traverses a membrane. The holes of one membrane may or may not be the same size and shape as the holes of another membrane. Although holes are described herein in terms of their having the shape of a circle, it is not required that a hole have a shape that is perfectly or even approximately circular.

The holes of one membrane may be aligned with the holes of another membrane, in the vertical sense of a line perpendicular or essentially perpendicular to the respective planes of the membranes, such that the holes overlap completely, partially or not at all. Holes overlap completely when, if they are the same size, their boundaries are coincident in vertical alignment, or if they are not the same size, the area of the smaller hole fits entirely within the area of the larger hole. Holes do not overlap at all when, again in the sense of vertical alignment, a line perpendicular or essentially perpendicular to the respective planes of the membranes that passes through a hole on one membrane does not pass through any part of a hole on the other membrane. Membranes that have no overlap are shown in FIGS. 1C and 2C. Partial overlap is the intermediate condition when the perpendicular or essentially perpendicular line passing through a hole on one membrane will pass through only a portion of a hole on the other membrane.

The term "open area" is used to refer to the extent, expressed as a percentage, to which the respective holes of two membranes overlap. For membranes that do not overlap at all, such as those of FIGS. 1C and 2C, the open area is defined as 0%. Conversely, an open area of 100% corresponds to the existence of the maximum open area, which is achievable by arranging a particular set of membranes such that the holes completely overlap. A percentage between 0 and 100 indicates partial overlap. The terms "not in registration" and, equivalently, "out of registration" are used herein to indicate that the holes in two membranes do not overlap at all (referring again, for example, to FIGS. 1C and 2C); this is equivalent to having an open area of 0. The term "substantially out of registration" indicates that there is partial overlap, i.e. that the open area of the membrane structure is in the range of from greater than 0% up to, but not including, 50%.

The adaptive membrane structure of this invention may be "actuated", which denotes the state of the structure upon the application or operation of a stimulus, such as a force (the "actuating stimulus"), which causes surfaces of adjacent membranes to move into contact with each other, thereby changing the permeability of the membrane structure. Adjacent membranes are membranes that may be brought into contact with each other. The term "unactuated" thus denotes the state of the adaptive membrane structure before application of the actuating stimulus, in which state a gap exists between the membranes that will be brought into contact upon application of the actuating stimulus. The term "deactuated" denotes the state of the adaptive membrane structure after the application and subsequent removal of the actuating stimulus when accompanied by re-formation of the gap between adjacent membranes that had been in contact when actuated.

The term "adaptive barrier system" as used herein denotes a system comprising an adaptive membrane structure in which actuation changes the permeability of the membrane structure to chemical, biological and/or particulate species.

Thus, the adaptive membrane structure of this invention is capable of displaying a variety of states of gas, vapor, liquid and/or particulate permeability. For example, when the membrane structure of this invention is used for protection against hazardous agents, it can display two different states of permeability. In one state, when hazardous environmental conditions do not exist, the membrane structure of this invention is highly permeable to water vapor and gases, thereby offering a high level of personal comfort. The term "unactuated" is used herein to denote this state. When the membrane structure of this invention is exposed to a hazardous environment, it is transformed to another state, in which it is impermeable to hazardous chemical and/or biological toxins and/or pathogens, thereby offering a high level of protection when it is needed. In the actuated state, the structure may, however, remain permeable to water vapor.

The conversion of the membrane of this invention from one state of permeability to another state of permeability is brought about by the application of a stimulus, such as a force, herein termed an "actuating stimulus". The actuating stimulus can be any of several forms including without limitation pressure, force, change in temperature or ambient concentration of water vapor, voltage, current, magnetic field, and electric field. In one embodiment of this invention, the actuating stimulus takes the form of an applied electric field, which causes membranes within the structure to move to convert the structure from an unactuated to an actuated state.

The application of the actuating stimulus could be effected with a manually operated switch. In an alternative embodiment, however, a sensor could detect a change in the environment in which the structure is located, and could automatically activate the actuating stimulus. The sensor could do this by responding, for example, to a change in temperature or humidity or to the presence (as indicated by change of concentration) of an undesirable chemical, biological and/or particulate species by sending a signal (for example, an electrical, optical or radio wave signal) to close a circuit to activate, i.e. trigger the application of, the actuating stimulus.

Figure 1B:
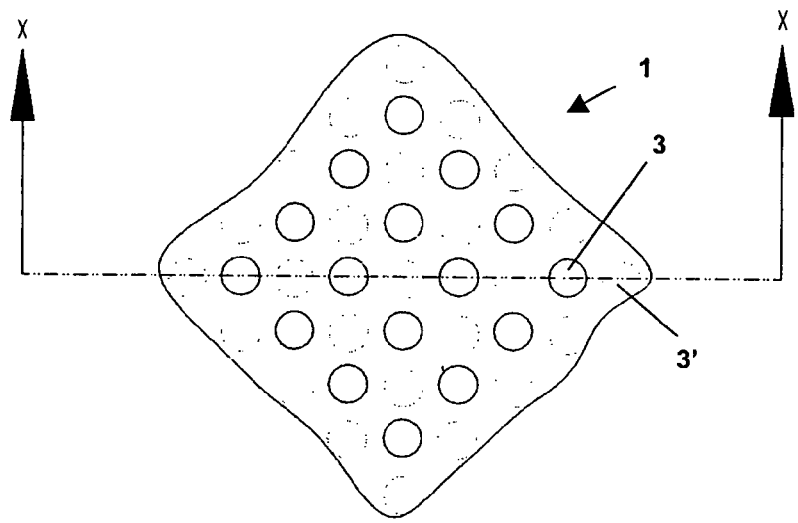
Figure 1C:
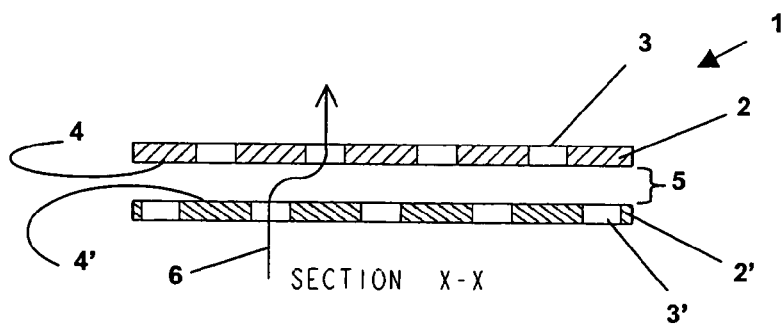

A schematic of a typical embodiment of the adaptive barrier system of this invention is shown in FIGS. 1A, 1B and 1C.

Figure 2A:
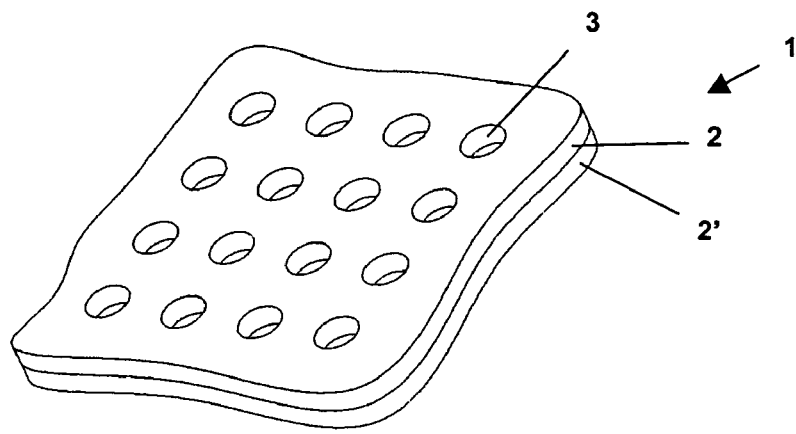
FIG. 2 is a schematic diagram of an adaptive membrane structure in its actuated state, illustrating the lack of registration of holes on adjacent membrane layers. (2A: perspective view. 2B: plan view. 2C: sectional view.)
Figure 2B:
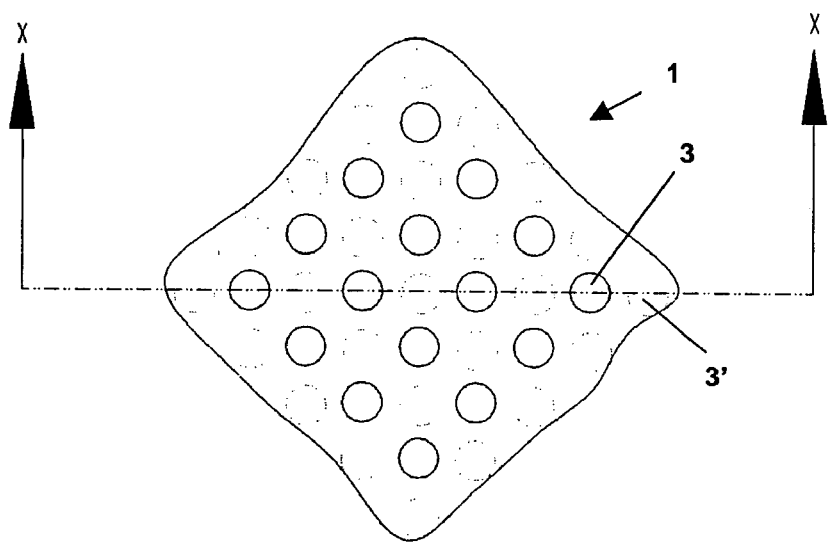
Figure 2C:
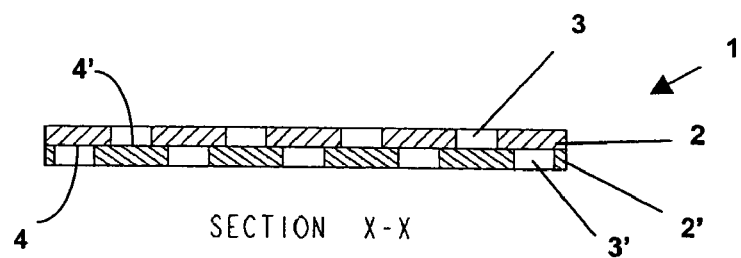

The system comprises a pair of planar membranes 2 and 2' that are largely parallel to each other, each membrane further comprising a geometric array of holes such as those denoted 3 and 3' in FIGS. 1A, 1B and 1C. The holes completely traverse the thickness of the membranes, giving rise to a path of increased convection and/or diffusion of a chemical, biological and/or particulate species across and through the membrane thickness when compared to convection and/or diffusion of the same species through the membrane material surrounding the hole. When the adaptive barrier system is not actuated, the adjacent surfaces 4 and 4' of the membrane pair 2 and 2' are not in contact with each other, such that a gap 5 exists between membranes 2 and 2'. When an actuating force is applied to the adaptive barrier system, it moves one or both of the membranes 2 and 2' the surfaces 4 and 4' of which are brought in contact with each other, thus eliminating the gap between 2 and 2', as shown in FIGS. 2A, 2B and 2C.

It is a further characteristic of the invention that the array of holes in each membrane is such that the openings of the array of holes on the adjacent membrane surfaces 4 and 4' are typically at least substantially out of registration with each other. That is, when the adaptive barrier system is actuated, the degree of hole overlap is such that the open area is reduced to less than 50%. It is preferred that the open area be reduced to 10% or less, and more preferred that it be reduced to 1% or less upon actuation. In a further preferred embodiment, the holes are out of registration, and the open area is reduced to 0% upon actuation. In this most preferred embodiment of the present invention, no hole opening on the surface 4 of the membrane 2 will overlap with a hole opening on the adjacent surface 4' of the membrane 2'. When the two adjacent membranes 2 and 2' are in contact, the holes of each membrane are therefore effectively sealed. There is consequently no continuous porous path for convection and/or diffusion of chemical, biological and/or other particulate species across two adjacent membranes in contact, as seen in FIG. 2C. However, when the two adjacent membrane surfaces 4 and 4' are not in contact, chemical, biological and/or other particulate species may traverse one membrane through its holes, enter the gap between the non-contacting membranes, and then traverse the second membrane through its holes (see, e.g., flow path 6 in FIG. 1C). Convection and/or diffusion of species will be greatly enhanced through adjacent membranes that are not in contact as compared to convection and/or diffusion of the same species when the same adjacent membranes have been moved into contact through action of the actuating force.

Figure 3:
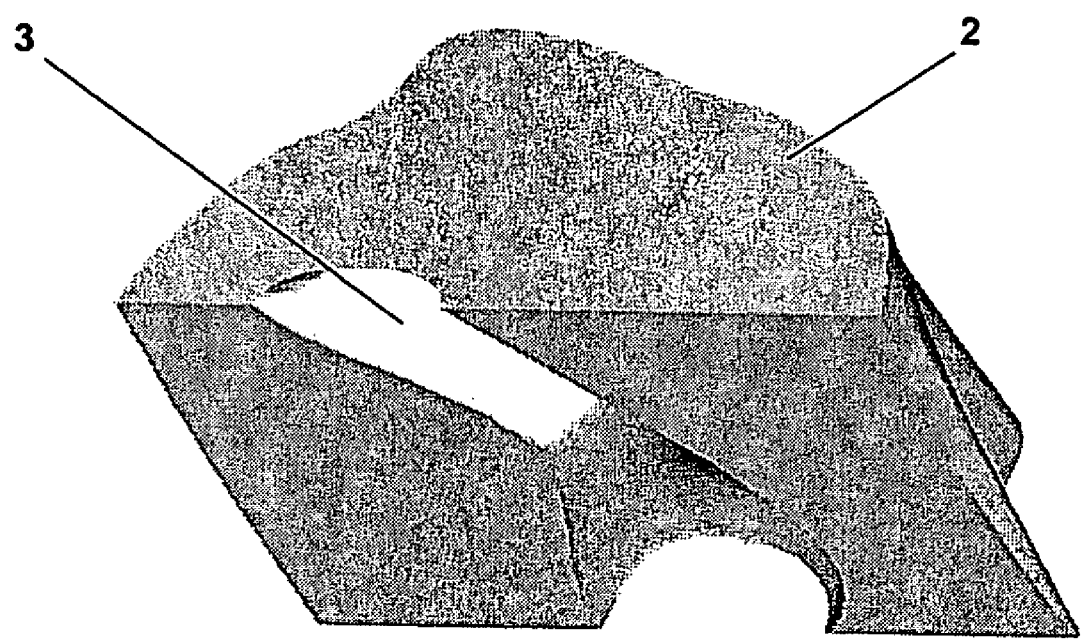
FIG. 3 is a schematic diagram of a section view of a membrane with a hole of non-circular cross-section.

As noted above, although the holes depicted in FIGS. 1A, 1B, 1C, 2A, 2B and 2C are right circular cylindrical holes with linear axes normal to the plane of the membranes, the holes of the invention are not limited to this geometry. In particular, each hole may have other non-circular cross-sectional shapes and/or inclinations of their axes relative to the plane of the membrane. Indeed, generally, it is not required that any hole traverse the membrane along a linear path but may instead follow a non-linear, tortuous path. Furthermore, the cross-sectional shape of any hole need not be constant as the hole traverses the membrane. FIG. 3 shows a section view of part of a membrane according to the invention with a hole with non-circular cross-section, which changes in shape and size as it traverses the membrane along a general tortuous path. The optimum hole diameter will vary depending on the specific use to be made of the adaptive membrane structure, particularly how much flow or diffusion is desired through holes in the unactuated state. In all cases, the holes must be large enough to allow transport to occur in the unactuated state.

Although the hole arrays depicted in FIGS. 1A, 1B, 1C, 2A, 2B and 2C comprise the same regular square pitch pattern, the hole arrays of this invention are not limited to this pattern. In particular, the array pattern on membrane 2 may be different from the pattern on membrane 2', and either pattern may comprise any regular or non-regular pitch pattern provided that the patterns are such that upon contact of the pair of adjacent surfaces 4 and 4' under action of the actuating force, the holes on the surface 4 of the membrane 2 will be at least substantially out of registration, if not out of registration, with the opening of any hole on the adjacent surface 4' of the membrane 2'.

Again referring to FIGS. 1A, 1B, 1C, 2A, 2B and 2C, the membranes 2 and 2' may be fabricated from the same or different materials or combinations of materials and, furthermore, each membrane of the pair may have the same or different thickness. The materials from which the membranes are fabricated are selected to impart desirable levels of permeability to one or more species, which may come in contact with the membrane in use. For example, the material comprising the membrane may be selected to have high permeability to water vapor but very low permeability to one or more human toxic or poison agents or pathogens as may be encountered by military personnel subjected to a chemical warfare attack.

The materials that may be used to create membranes 2 and 2' can be chosen from any sheet structure, but it is preferred that the sheet structure be flexible, and it is also preferred, although not necessary, that the materials used are polymeric in nature. Preferably, the flexible sheet structure may be prepared from at least one polymer component. Such polymer sheets or films, used to create membranes 2 and 2', may be continuous (i.e. containing no microvoids or micropores) or microporous. Methods for creating polymer sheets or films are well known in the art. Such polymer sheets or films can be prepared from a large variety of polymers. Polymers that may be used for creating sheets or films include without limitation polyesters, polyolefins (especially high-performance polyethylene), polyamides (aliphatic, aromatic, and mixed aliphatic/aromatic), polybenzazoles, polyimides, polyacrylonitrile, polysulfones, polycarbonates, homopolymer and copolymers of tetrafluoroethylene, homopolymer and copolymers of vinylidene difluoride, copolymers of butadiene and styrene, copolymers of ethylene and vinyl acetate, copolymers of ethylene and vinyl alcohol, copolymers of ethylene and acrylic monomers such as methacrylic acid and acrylic acid, and ionomers. Nonlimiting examples of suitable ionomers include ionomers formed by neutralizing copolymers of ethylene acid copolymers, perfluorinated sulfonate and carboxylate ionomers, and sulfonated polystryrene.

Polymer films and sheets produced from thermoplastic and vulcanized elastomers such as, but not limited to, polyurethanes, block copolymers and random copolymers of styrene and butadiene, block copolymers and random copolymers of styrene and isoprene, homopolymers of butadiene and isoprene, copolymers of ethylene and propylene, fluoroelastomers, natural rubbers, nitrile rubbers, polyacrylate rubbers, butyl rubbers and silicone rubbers are also useful as membrane materials in the present invention.

Continuous polymer films to be used to create membranes 2 and 2' may also be semipermeable in nature. Semipermeable polymer membranes and their manufacture are known, for example, from sources such as U.S. Pat. No. 4,515,761 (Plotzker) and U.S. Pat. No. 6,579,948 (Tan).

The starting materials to create the membranes used in the present invention are not limited to continuous polymer films. Suitable starting materials may also have microvoids or micropores such as those present in microporous membranes, in which the typical pore size is about 0.1 to 10 micrometers. Various methods for creating microporous membranes include

- the track-etch process used for creating Nuclepore® brand polyester and polycarbonate membranes (Whatman Inc., Clifton, N.J.);
- phase inversion processes for creating polysulfone, aromatic polyamide, and polyvinylidene fluoride membranes;
- stretching processes for creating microporous polytetrafluoroethylene and polyethylene membranes;
- phase separation processes in which a nonreactive species ("porogen") present during a polymerization reaction is subsequently extracted from the polymer product; and
- spun bonded/melt blown processes for creating nonwoven sheet structures.

The membrane may also contain materials to adsorb, absorb or react with harmful and undesired species. Hence, the membrane may include activated carbon, high surface silica, molecular sieves, xerogels, ion exchange materials, powdered metal oxides, powdered metal hydroxides, antimicrobial agents, and the like, which may be in the form of nanoparticles if so desired. Such materials would typically be mixed into the membrane material during the membrane formation process, such as, which might include a process such as extrusion compounding or solution casting.

Holes, for the adaptive membrane structures of this invention, may be formed by any hole manufacturing process known in the art. Mechanical processes that may be used for creating holes in sheets and films include without limitation drilling, punching, piercing, boring and perforating. Holes may also be created by other methods such as ultrasonic waves, electrical discharge, high energy radiation such as lasers and electron beams, and high velocity water jets. Various etching techniques, whereby material is removed by chemical means, may also be used to create holes for this invention. A preferred hole manufacturing process for this invention is one in which material occupying the space where the hole is to be created is removed with the least amount of distortion to the material surrounding the hole. Methods for hole manufacturing that are especially preferred are mechanical punching and laser or electron beam drilling. Once the holes have been created, the membranes of this invention may be further processed to reduce any surface distortion that may have resulted due to hole formation process. Processes that may be used include without limitation calendaring, pressing and planishing.

A preferred actuating stimulus for use in this invention is the force produced by electrostatics. The preferred electrostatic force may be applied to the system by incorporating electrically conducting materials in or onto specific regions of at least two and possibly more membranes such that upon action of appropriate circuitry, the conducting regions on at least two membranes become oppositely charged, thereby creating an attractive force which brings two adjacent membranes into contact. In one embodiment, therefore, means to respond to an actuating stimulus may include such electrically conducting materials, and the features, lines and patterns into which they may be formed, on which an electrostatic force may operate.

Figure 4A:
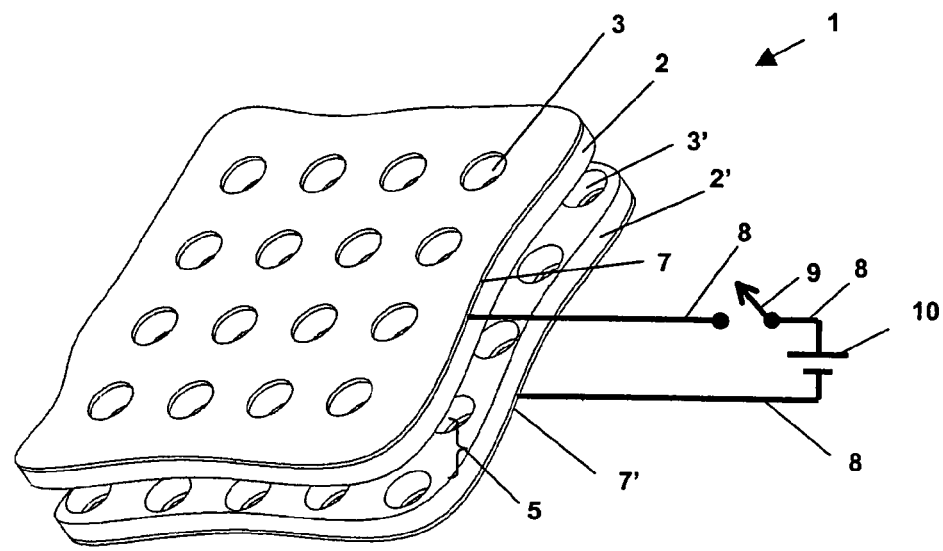
FIG. 4 is a schematic diagram of an unactuated adaptive membrane structure comprising a pair of adjacent membranes, each outer surface coated with a conducting layer. (4A: perspective view. 4B: plan view. 4C: sectional view.)
Figure 4B:
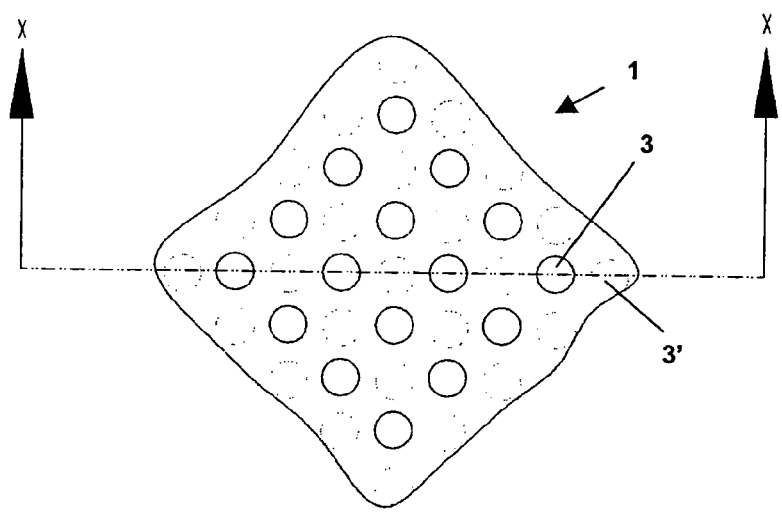
Figure 4C:
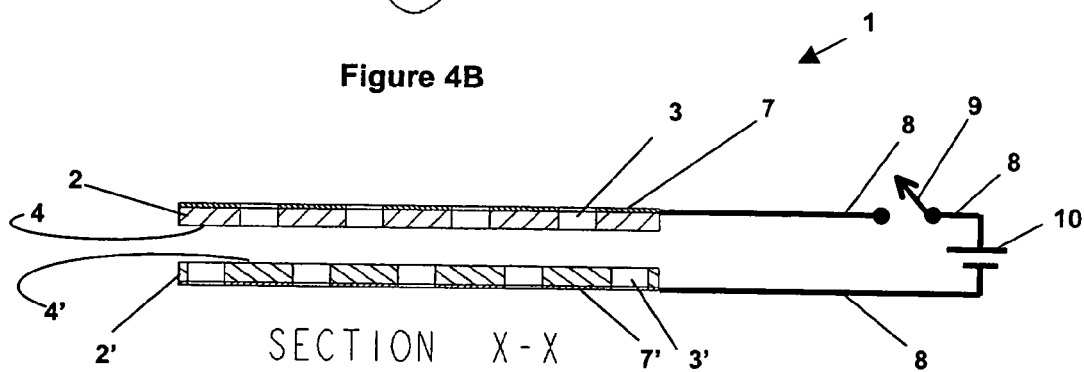

FIGS. 4A, 4B and 4C show schematically a particular embodiment of a pair of adjacent membranes 2 and 2' configured for an electrostatic actuating force. In this case, the surface of each membrane that is not adjacent to gap 5, which separates the membranes, is coated with a conducting layer 7 and 7'. As the adaptive membrane structure of this invention may contain one or more membranes and/or layers in addition to the two membranes that are brought into contact by the actuating stimulus, it is not required in this embodiment that more than two membranes have a conductive coating, or that the membranes that have a conductive coating are the membranes that are brought into contact. That is, layers and/or other membranes may be interposed between the membranes with holes that come into contact and the place where direct application of the actuating stimulus occurs. Whatever is required to make the membranes with holes move is, however, part of the adaptive membrane structure, and the permeability of the structure is thus determined with respect all such components, be they just the two membranes with holes or additional layers, membranes and/or other materials or components.

Possible metallic conductive coatings may include without limitation silver, aluminum, copper, nickel, palladium, platinum, gold and alloys of these metals. An electrically conductive coating may also be prepared by dispersing colloidal forms of the aforementioned or other conductive metals into various polymers. Electrically conductive layers or electrodes may also be prepared from carbon black, graphite, carbon nanotubes, fullerenes and dispersions of such forms of carbon into polymers. Additional forms of conductive layers or electrodes include those, which may be formed from indium tin oxide or from polymers that are inherently electrically conducting. Electrically conducting polymers include without limitation polyacetylene, polyaniline, polythiophenes, polypyrrole, poly(p-phenylene), poly(p-phenylene vinylene) or such conductive polymers that have been chemically modified, for example, with dopants to increase conductivity. The conducting layers 7 and 7' may comprise the same or different materials and thickness.

Figure 5A:
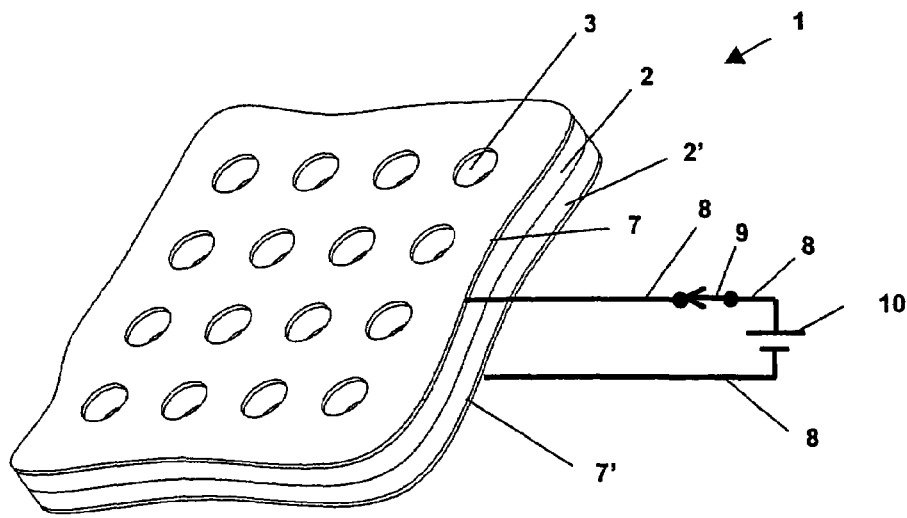
FIG. 5 is a schematic diagram of the adaptive membrane structure system of FIG. 4 as actuated. (5A: perspective view. 5B: plan view. 5C: sectional view.)
Figure 5B:
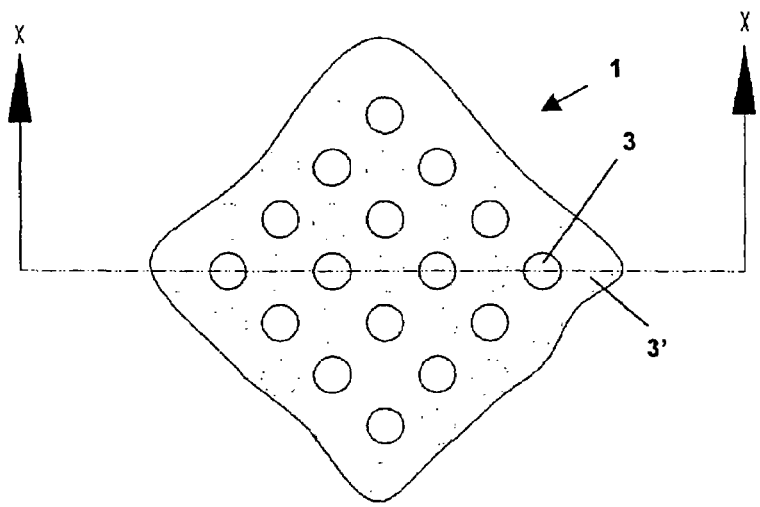
Figure 5C:
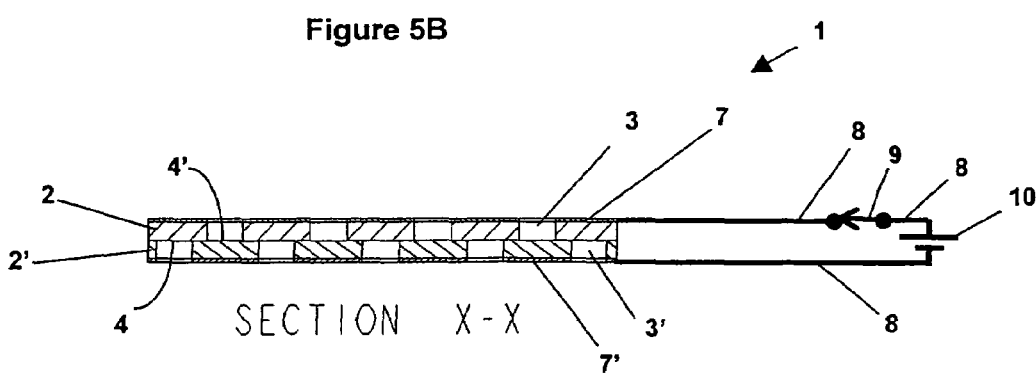

As depicted in FIGS. 4A and 4C, the two coated layers on the adjacent membranes are connected in series with each other through conductors 8 to a switch 9 and a source of electrical potential 10 which may include a battery or other power source such as a solar panel or fuel cell. As shown in FIGS. 4A and 4C, when the switch is open, there is no electromotive force and thus no actuating stimulus. As shown in FIGS. 5A and 5C, however, when the switch is closed, an attractive electrostatic force develops between the membranes and thereby brings the membranes into contact along their adjacent surfaces.

For example, an adaptive membrane structure may be fabricated by a process of (i) providing at least two membranes, each independently comprising a flexible sheet, film, microporous membrane, or nonwoven layer; each membrane containing an array of holes, (ii) assembling the membranes parallel to each other such that the holes in adjacent membranes are substantially out of registration or are out of registration, and (iii) providing a means responsive to an actuating stimulus to the assembled membranes. In addition, an electrically conductive layer may be applied to one side of each of at least two of the membranes, and the electrically conductive layers may be attached to a voltage source and a switch. The holes may be made by at least one method selected from among mechanical drilling, punching, piercing, boring, perforating, drilling with ultrasonic waves, drilling by electrical discharge, laser drilling, electron beam drilling, and drilling with high velocity water jets.

Figure 6A:
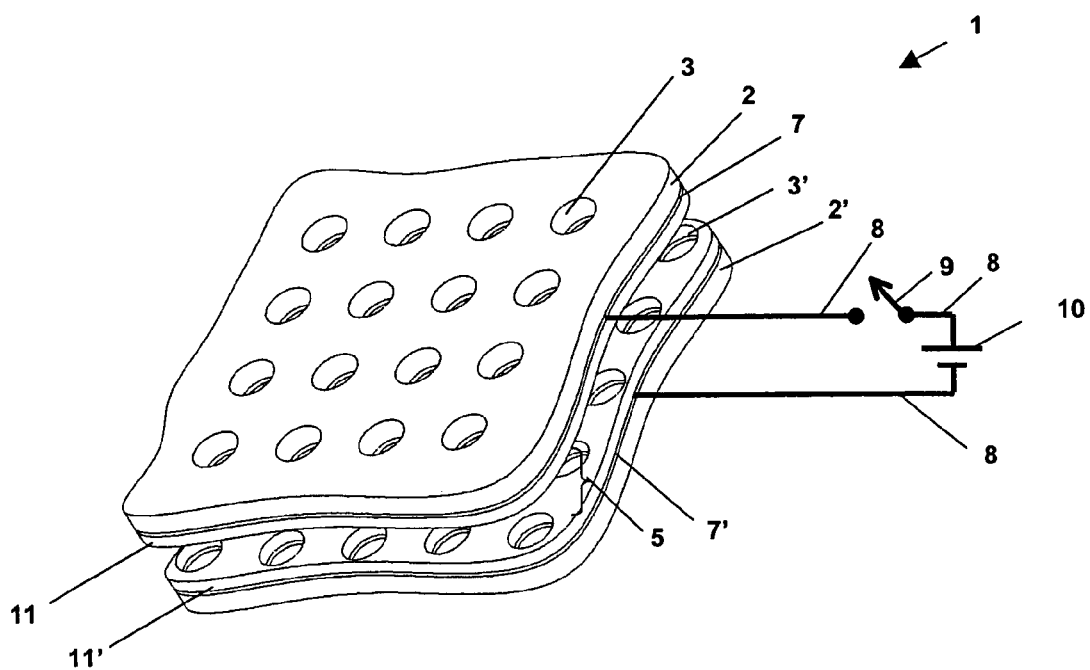
FIG. 6 is a schematic diagram of an adaptive membrane structure in which conductive layers are coated with dielectric material. (6A: perspective view. 6B: plan view. 6C: sectional view.)
Figure 6B:
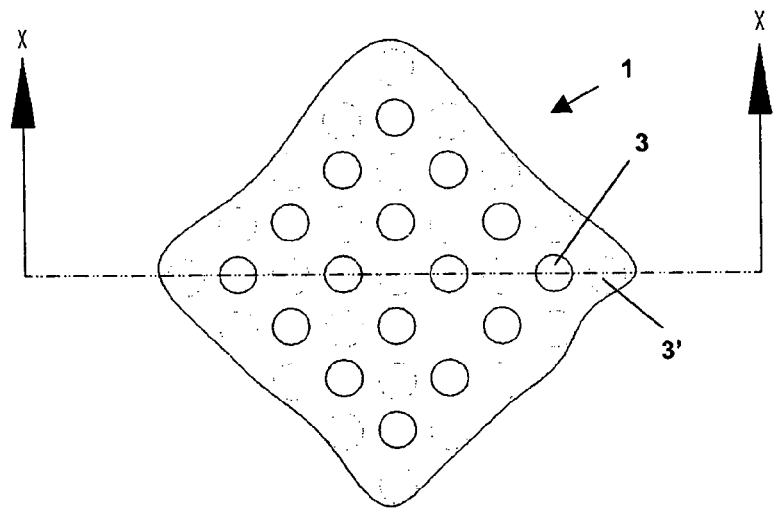
Figure 6C:
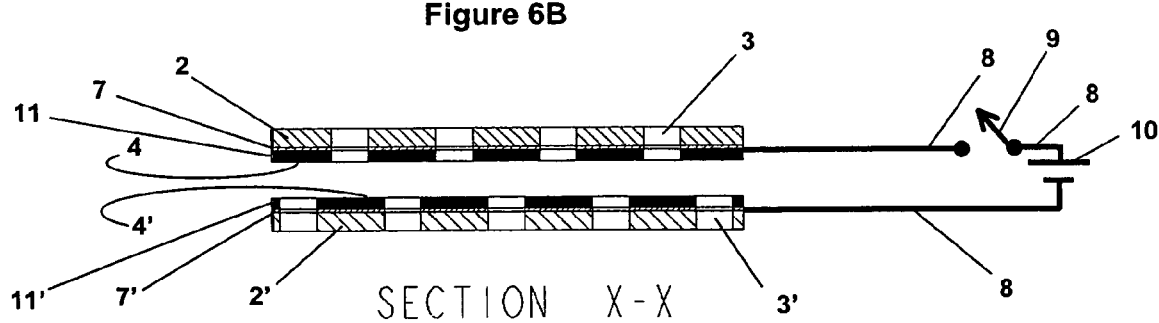

Additionally, as shown for example in FIGS. 6A, 6B and 6C, the conductive layers 7 and 7' on each membrane may be coated with one or more dielectric layers 11 and 11', which can impart additional features to the membrane structure. In particular, these layers may serve to insulate the conductive layers 7 and 7' from the environment thereby eliminating or minimizing the potential for undesirable shorting or arcing of the charged conductive layer to surrounding conductive objects. The dielectric layers 11 and 11' may comprise the same or different materials and thickness. Furthermore, in general, the dielectric layers 11 and 11' may be the same material or a different material than that comprising the substrate membranes 2 and 2'. Note further that a dielectric layer may be installed on the side of membrane that will be brought into contact with another membrane, or on the opposite side. For example, in FIGS. 6A and 6C, dielectric layer 11 is on the side of membrane 2, and dielectric layer 11' is on the side of membrane 2', that will be brought into contact with each other. The contact in this situation will actually be between the two dielectric layers 11 and 11'. In the embodiment shown in FIG. 7A, however, contact will be made by membrane 2 on the side opposite from layer 11, and in the embodiment shown in FIG. 7B, contact will be made by each membrane on the side opposite from which the dielectric layer is installed.

Figure 7A:
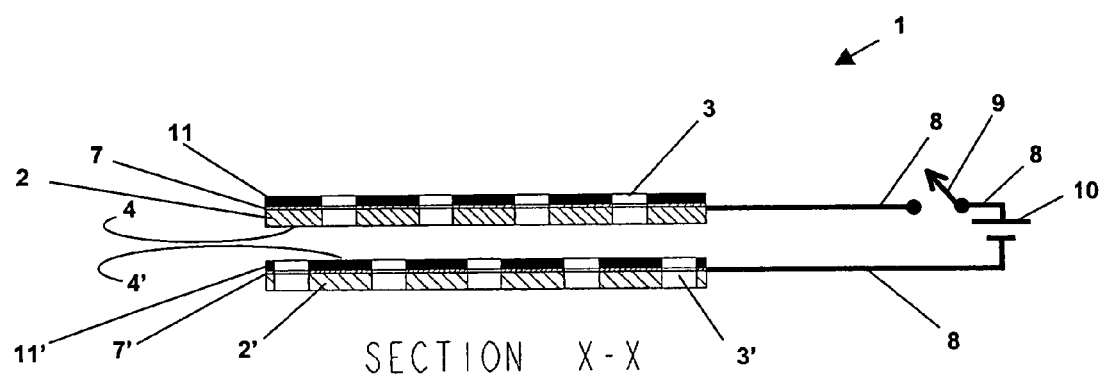
FIG. 7 is a schematic diagram of a sectional view of alternative configurations of an adaptive membrane structure comprising two substrate membranes, two conductive layers, and two dielectric coatings.

In those cases where the dielectric layer is positioned to face the adjacent membrane as in FIGS. 6C and 7A, an added function of the dielectric layer may be to enhance the seal formed when the membranes come in contact as a result of application of the actuating stimulus. In particular, as described in the examples below, a coating comprising a compliant dielectric material such as an elastomer is especially suited to provide a compliant surface to enhance sealing of the membrane surfaces in contact under action of the actuating stimulus. Such elastomers include without limitation polyurethanes, polyurethane-ureas, thermoplastic and vulcanized forms of styrene butadiene and styrene isoprene rubbers, natural rubber, silicone rubbers, butadiene rubbers, ethylene propylene rubbers, acrylic rubbers, and fluoroelastomers.

Figure 7B:
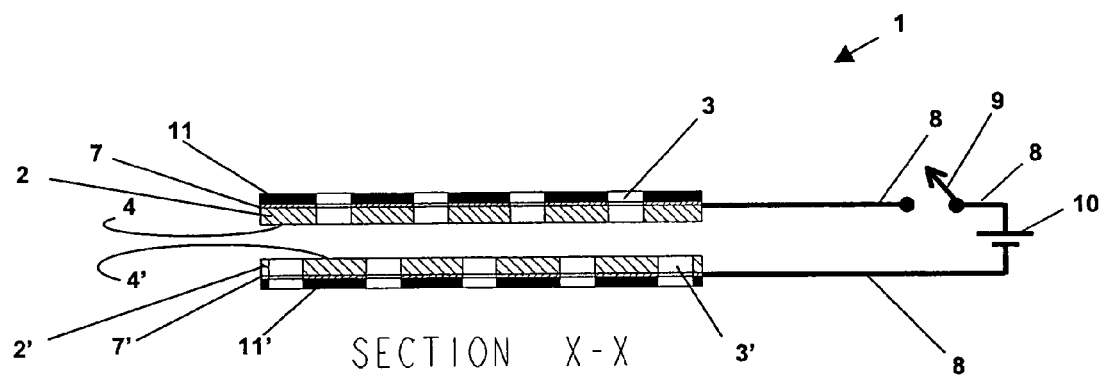

In certain embodiments, a conductive layer 7, and a dielectric layer 11 if present, may be installed on the side of a membrane 2 that will not come into contact with another membrane 2'. This embodiment is shown in FIG. 7B. In this kind of embodiment, it is preferred that the holes 3, in addition to fully penetrating the substrate membranes 2 and 2', also fully penetrate conductive layers 7 and 7' and also fully penetrate the dielectric layers 11 and 11'. It is not required, however, that in such case the holes 3 fully penetrate the conductive and dielectric layers, and either or both of those layers may instead cover the entire surface of that side of the membrane 2 and/or 2'. In such case, the permeability of the conductive and/or dielectric layer can influence the overall permeability of the membrane structure to the passage of the chemical, biological and/or other particulate species for which the system is designed.

Yet another function of the dielectric layer may be to adsorb, absorb, or react with harmful and undesired species that may diffuse into the membrane structure when the membrane is in the unactuated state. Hence, the dielectric layer may include activated carbon, high surface silica, molecular sieves, xerogels, ion exchange materials, powdered metal oxides, powdered metal hydroxides, antimicrobial agents, and the like, which may be in the form of nanoparticles if so desired.

Figure 8:
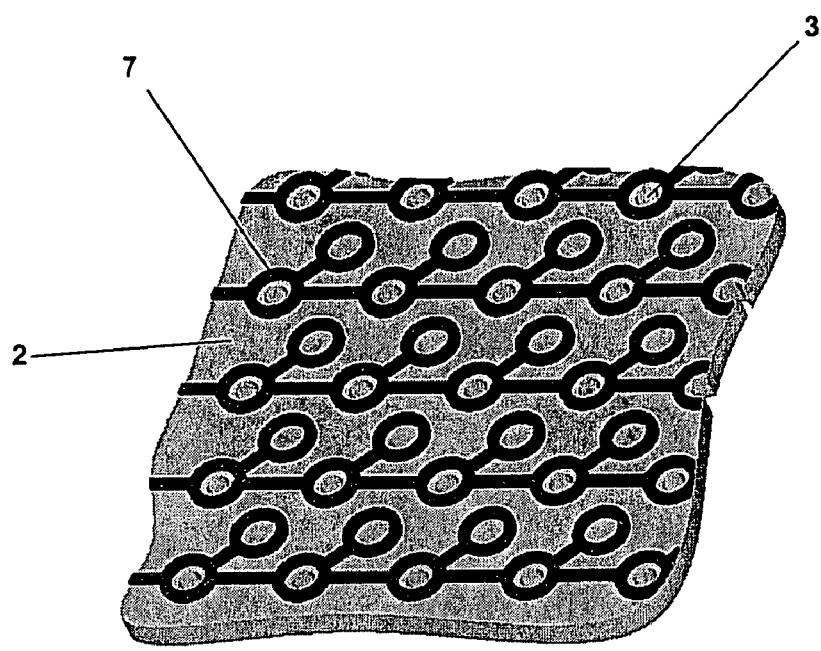
FIG. 8 is a schematic diagram of a substrate membrane of an adaptive membrane structure in which a conductive layer is applied to the substrate membrane in an annular pattern around each hole.
Figure 9:
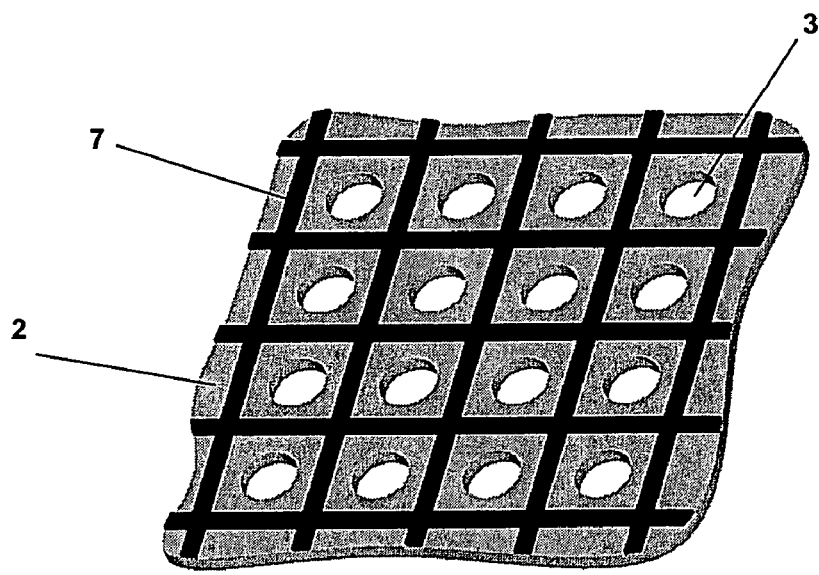
FIG. 9 is a schematic diagram of a substrate membrane of an adaptive membrane structure in which a conductive layer is applied to the substrate membrane in parallel lines.

Alternatively, the conducting layers need not cover the entire surface of a substrate membrane but instead may be selectively applied in a pattern, which only partially covers the substrate membrane surface. One such example is shown in FIG. 8, in which a conductive layer 7 is applied to a substrate membrane 2 in an annular pattern around each hole 3. All the annuli are connected to each other using electrically conducting lines applied to the substrate membrane 2 such that all the annular patterns are electrically connected to each other in series so that all annuli can be held at the same electrical potential by appropriate connection to a voltage source at some point in the network of lines and annuli. Another possible patterned electrode is shown in FIG. 9, in which the conducting layer 7 comprises two arrays of parallel electrically conducting lines applied to the substrate membrane 2 traversing the space between the holes. In the particular pattern shown in FIG. 9, it is seen that any line from either array intersects and is perpendicular to the lines in the other array. Again, all points in this network of lines may be held at a single electrical potential by appropriate connection to a voltage source. The use of a patterned conducting layer as shown in FIGS. 8 and 9, as opposed to a continuous electrode as shown in FIG. 4, can increase the desirable permeability of the structure in the actuated state to species such as water vapor, since the barrier afforded by the electrode material to transport of these desirable species is removed over much of the substrate membrane surface. There are many other geometric patterns that could be used to provide electrodes in this invention.

The method for laying down conductive features, lines and patterns onto surfaces is well known in the electronic manufacturing art. Some of the processes that may be used for creating conductive features include without limitation letterpress printing, screen printing, gravure printing, offset lithography, flexography, electrophotography and laser jet printing. Several additional variations of lithographic printing for laying down micron and submicron conductive features onto surfaces are also well known in the art.

Figure 10:
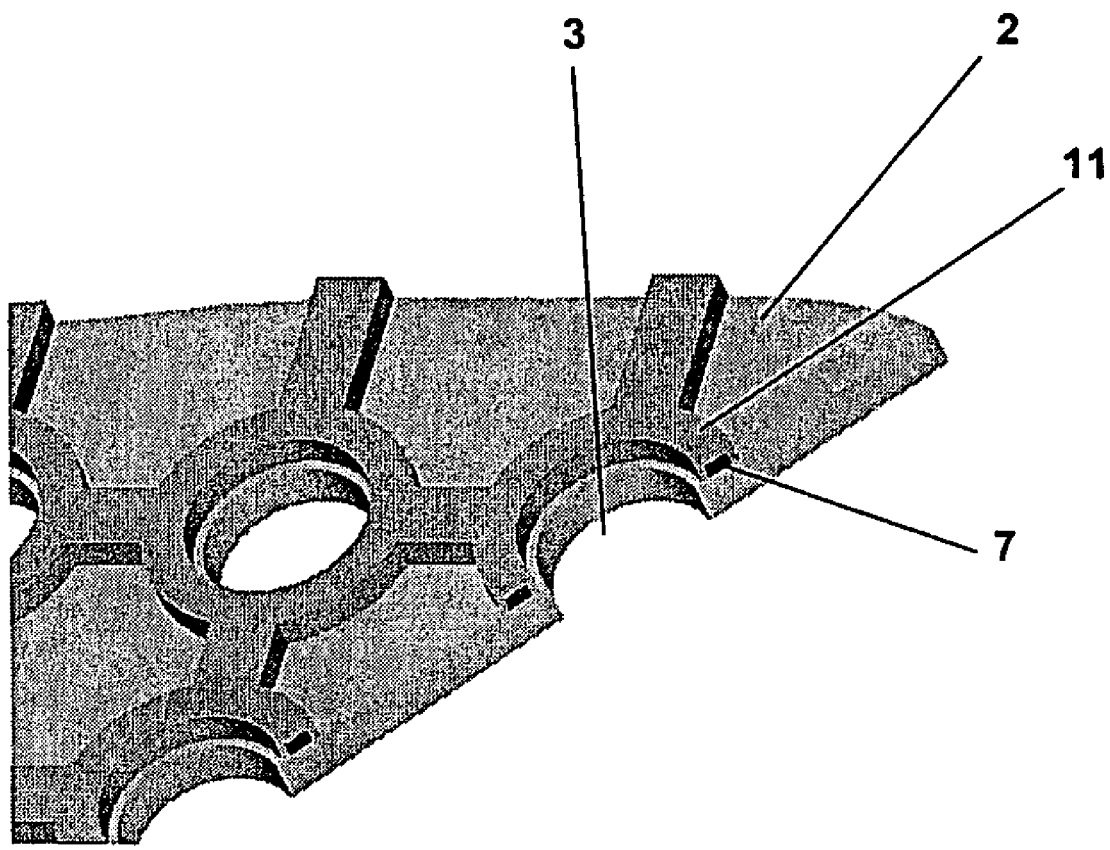
FIG. 10 is a schematic diagram of a portion of a substrate membrane of an adaptive membrane structure in which a patterned dielectric layer is applied to a patterned electrode layer applied to a substrate membrane.

Dielectric layers, if they are incorporated in the structure as described above, also need not cover the entire surface of the substrate membrane. In particular, if a patterned electrode is used in a structure of this invention, a patterned dielectric layer may be used which covers the patterned electrodes to electrically isolate them from their surroundings, but the dielectric layer need not cover all of the remaining substrate surface, which is not covered by the patterned electrode layer. FIG. 10 shows an example of a patterned dielectric layer 11 applied to a patterned electrode layer 7 applied to a substrate membrane 2 in a similar design. It will be noted that the patterned dielectric in this example covers an area slightly larger than the patterned electrode to insure isolation of the electrode. Note that the patterned dielectric layer may also have functions in addition to electrical isolation as described above for dielectric layers that cover the entire substrate surface. In particular, it may serve to enhance the sealing of the membrane surface to the adjacent membrane surface. The aforementioned processes for patterning conductive layers may also be used to pattern dielectric layers onto membrane substrates of this invention.

Figure 11A:
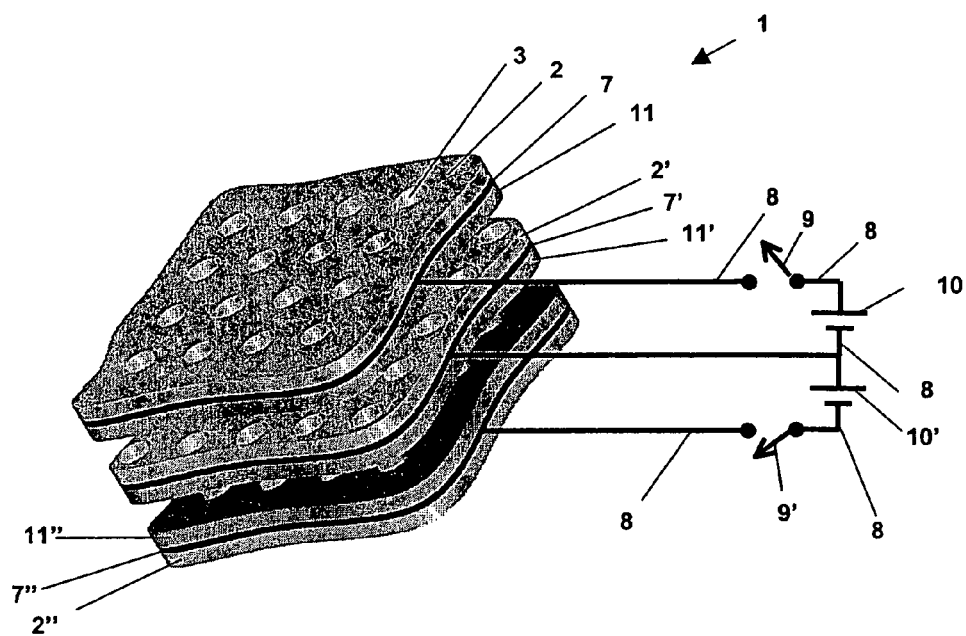
FIG. 11 is a schematic diagram of an adaptive membrane structure comprising three substrate membranes, three conductive layers, and three dielectric layers. (11A: perspective view. 11B: plan view. 11C: sectional view.)
Figure 11B:
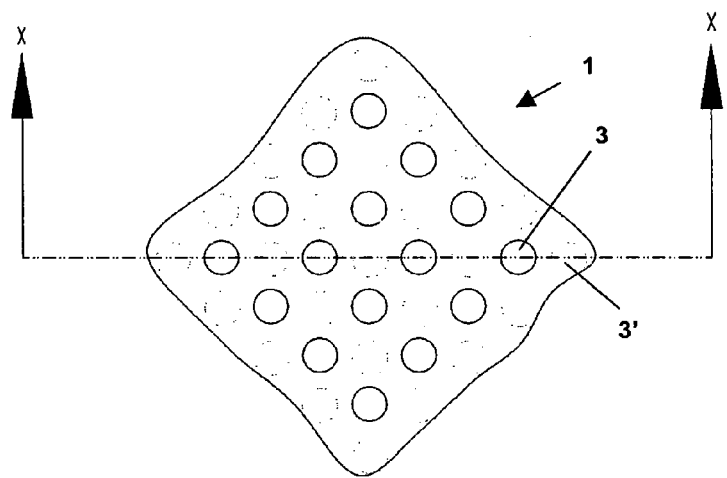
Figure 11C:
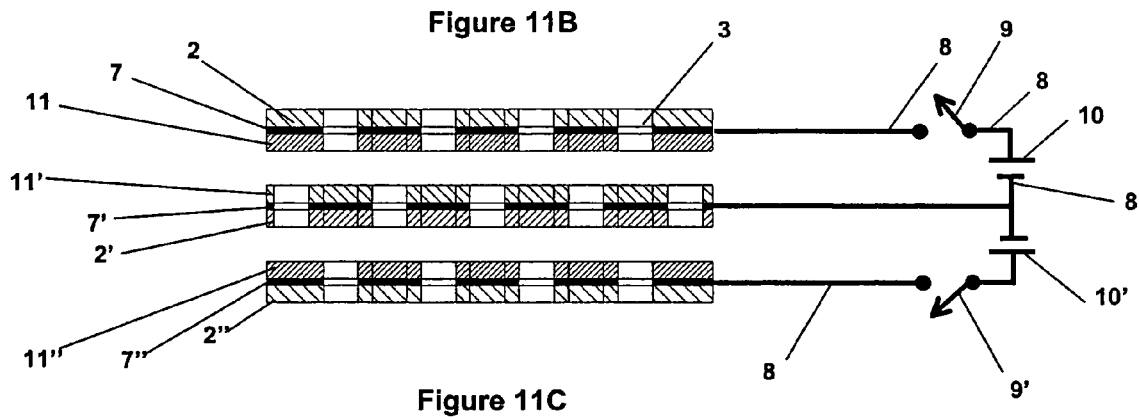

This invention is not limited to adaptive membrane structures having only two substrate membranes. For example, FIGS. 11A, 11B and 11C show an adaptive membrane structure comprising three substrate membranes 2, 2' and 2". Since, in this embodiment, the means responsive to the actuating stimulus again includes one or more electrical conductors, conducting layers 7, 7' and 7" and associated dielectric layers 11, 11' and 11", as well as their associated array of holes, are shown in addition to substrate membranes 2, 2' and 2". The openings of the array of holes on membrane 2 in relation to the holes of membrane 2' are shown to be out of registration, and the openings of the array of holes on membrane 2' in relation to the holes of membrane 2" are shown to be out of registration. As noted above, however, the openings of the array of holes on membrane 2 in relation to the holes of membrane 2', and the openings of the array of holes on membrane 2' in relation to the holes of membrane 2", could, either or both, be substantially out of registration instead of out of registration.

Figure 12A:
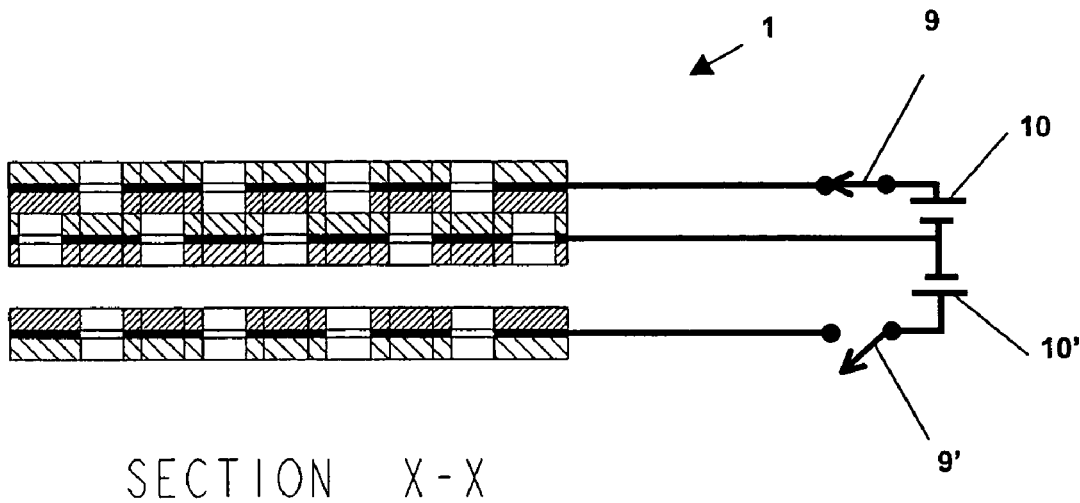
FIG. 12 is a schematic diagram showing a sectional view of three possible states of actuation of an adaptive membrane structure comprising three substrate membranes, three conductive layers, and three dielectric layers.
Figure 12B:
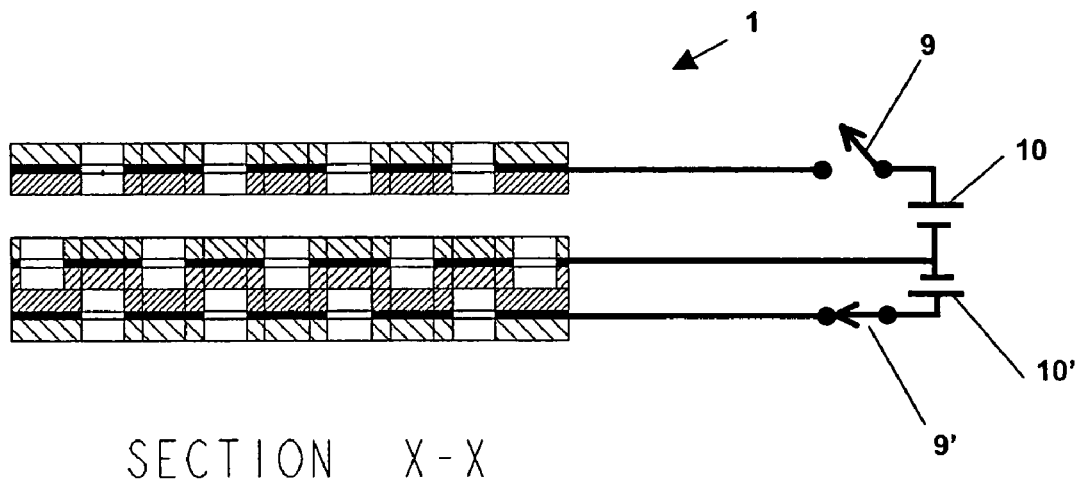
Figure 12C:
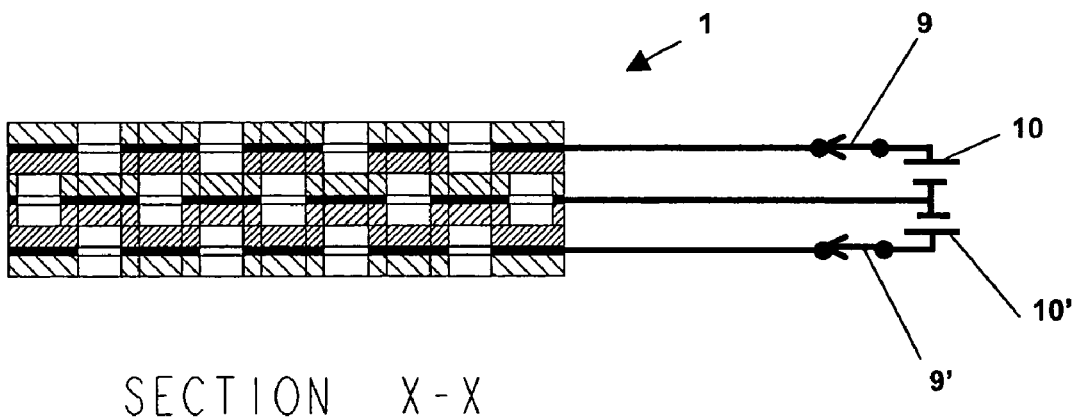

Two potential sources 10 and 10', switches 9 and 9', and conductors 8 are provided to permit electrostatic actuation of the conductors in the system. Thus, three different actuation states can be achieved with this system. As shown in FIG. 12A, the upper and middle membranes may be brought in contact and only their associated holes sealed by closure of switch 9. Or, as shown in FIG. 12B, the middle and lower membranes may be brought in contact and only their associated holes sealed by closure of switch 9'. Or, as shown in FIG. 12C, the upper and middle as well as the middle and lower membranes may be brought in contact and all holes may be sealed by closure of both switches 9 and 9'.

Note that the materials and thickness of substrate membranes 2, 2' and 2" may be the same or different. Likewise, the materials and thickness of conducting layers 7, 7', and 7" may be the same or different. Likewise, the materials and thickness of the dielectric layers 11, 11', and 11" may be the same or different. Furthermore, the choice of which side of the substrate membrane to use for placement of the dielectric layer, for any or all of the three membranes, may be reversed as previously disclosed above.

The design disclosed in FIGS. 11A, 11B and 11C may be extended to four or more membranes as well by addition of appropriate component substrate membranes, conducting layers, dielectric layers, hole arrays, potential sources, switches and conductors. Furthermore, the conducting and dielectric layers may cover the entire substrate membrane surface to which they are applied or they may be patterned following, for example, the designs previously disclosed. Multiple membrane systems enable adaptive barrier systems, which can selectively impede the passage of different chemical, biological and/or other particulate species by actuating different combinations of adjacent membrane closures. Such systems may include, in addition to one or membranes in addition to two that are brought into contact, one or more layers of fabric.

The embodiments disclosed above may thus include, for example, in addition to first and second membranes (2 and 2'), a third membrane 2" having holes, and means to respond to an actuating stimulus that moves the third membrane into contact with the second membrane in a position in which the holes of the third membrane are substantially out of registration with, or are out of registration with, the holes of the second membrane. The structure may also include third and/or fourth membranes (2" and 2'") having holes, and means to respond to an actuating stimulus that moves the third membrane into contact with the second and/or fourth membrane in a position in which the holes of the third membrane are substantially out of registration with, or are out of registration with, the holes of the second and/or fourth membranes.

Although an applied electric field is a preferred form in which the actuating stimulus will operate, there are numerous other types of actuating stimuli that are useful for the purpose of causing the movement of membranes in the structure of this invention. Other possible actuating stimuli include without limitation a magnetic force, hydrostatic force, or hydrodynamic force, and two or more different kinds of actuating stimuli may be used on a membrane structure.

For example, certain polymers can absorb considerable amounts of water and other solvents, and can thereby swell to volumes that are significantly greater than the original dry volume. In so doing, the expansion and change of dimension of such a swellable polymer can transmit a hydrostatic force that would cause membrane movement.

Changes in temperature can also serve as another form of an actuating stimulus. Certain synthetic materials, naturally-occurring materials and engineered structures can generate significant forces as they change their dimensions in response to changes in temperature. Such a gain or loss of thermal energy may thus also be used to cause the movement of membranes herein, working through the material as its size is changed thereby.

In another embodiment, an electrostrictive material may be used to transmit a force derived electrically. An electrostrictive material, when subjected to electrical voltage, can undergo size deformation, with a consequent change in dimension, which can produce a force that will transmit the effect of the actuating electrical stimulus and move a membrane.

An embodiment based on the use of a magnetic force as the actuating stimulus can be configured by incorporating a spiral or helical winding of a conducting wire (e.g. copper wire) in the adaptive membrane structure so that the winding is adjacent to the membranes in the structure and oriented such that the axis of the winding is normal to the plane of the membranes. The winding is electrically connected in series with a switch and a source of electrical power such as a battery. A magnetic material is incorporated in one or more of the membranes in the structure, and the membranes are appropriately located within the structure such that their motion under action of the force of magnetic attraction will cause them to come in contact with each other or with one or more other adjacent membranes. The magnetic material could be incorporated within the bulk of a membrane or as a coating on a membrane surface. Possible magnetic materials include carbonyl iron particles dispersed within the bulk of a membrane or within a matrix comprising a coating on a membrane surface. Upon actuation of the system by closure of the switch, a magnetic field will develop in the vicinity of the winding, and this field will generate a force on the magnetic material incorporated in one or more membranes thereby causing the membrane(s) containing the magnetic materials to come in contact with one or more adjacent membranes.

The examples discussed above also illustrate a corresponding variety in the means that is provided to respond to the actuating stimulus, examples of which included above are a swellable polymer, a material that changes size in response to temperature change, an electrostrictive material and a magnetic material. Also suitable for use as means responsive to an actuating stimulus is a thermoelectric material, which can generate electrical energy when subjected to a change in temperature, and thus transmit to membranes the force a useful voltage that is representative of a gain in thermal energy.

The means responsive to the actuating stimulus are typically located in, on, within or adjacent to the adaptive membrane structure in the sense that they must be in close enough physical proximity to enable application of the force of the actuating stimulus to move at least one membrane. A conductor or magnetic particles may, for example, be printed on a membrane that has holes, may be printed on another membrane or layer that does not have holes, or may be formed itself as a separate membrane or layer. Further, a polymer or layer that changes shape and/or size may be located adjacent to a membrane that has holes, although other membranes or layers that do not have holes may be located there between provided that the mission of the polymer or material to apply a moving force to the membrane with holes is not hindered.

In view of the variety of forms in which the actuating stimulus may exist, as described above, another aspect of this invention is an adaptive membrane structure that includes first and second movable membranes, and means to respond to an electrical, a magnetic, a hydrodynamic or a hydrostatic force. This also enables, in a membrane structure that includes first and second movable membranes, a method for moving the first membrane toward the second membrane by applying an electrical force, a magnetic, a hydrodynamic or a hydrostatic force to the first membrane.

Whatever form the actuating stimulus takes, it operates in one embodiment to a substantially uniform extent on all portions of at least one membrane. In particular in this embodiment, the actuating stimulus operates to a substantially uniform extent on the portion of a membrane proximal to each of the holes thereof, and thus in a regular pattern all across the surface of the membrane. The operation of the actuating stimulus is only substantially uniform because the membrane is pliable and will in many cases not form a perfect plane on which the applied force may operate equally on all infinitely small units of area across the surface of the plane. The intention in such case, however, is that the entire membrane move as a result of the application of the actuating stimulus.

In another embodiment, however, the actuating stimulus does not operate to a uniform extent on all portions of the membrane, and one or more portions of one membrane are moved into contact with a corresponding portion or portions of another membrane in a position in which the holes of each portion of the first membrane are substantially out of registration, or are out of registration, with the holes of the corresponding portion of the second membrane. If there is more than one portion of the membrane where contact is made, the portions may, but need not, be selected in the form of regularly repeating geometric pattern. When the portions are distributed across the surface of the membrane in a regular pattern, it then becomes possible to regulate the permeability of the membrane structure by arranging for the actuating stimulus to be operative in only certain selected portions of the membrane at one time. It also becomes possible to rotate the application of the actuating stimulus, in a repeating sequence of actuation and deactuation, among the various portions on a programmed basis. This is most easily accomplished where an electrical force is the actuating stimulus, and circuity is provided that enables current to be supplied to or withdrawn from portions of the membrane with whatever spatial and timing arrangement is desired.

In particular, the adaptive membrane structure of this invention can be designed to display multiple states of gas, vapor and/or liquid permeability in addition to and different from those exhibited when the adaptive membrane structure is in the fully actuated, fully unactuated or fully deactuated state. In one embodiment, an adaptive membrane structure may be formed to have two or more portions or subsections, where each subsection of the structure is itself an adaptive membrane structure that displays some or all the features described herein. The permeability of the structure as a whole may be altered by changing the permeability of some or all of the subsections of the structure, and by doing so at different times. An actuating stimulus can be applied to each subsection of the membrane structure independently of all the other subsections. Hence, several different states of permeability may be obtained for the structure as a whole by moving membranes in some of the subsections, while not moving membranes in other of the subsections, that together make up the adaptive membrane structure as a whole. In another embodiment, however, all membranes in all subsections may be moved at the same time.

Figure 20:
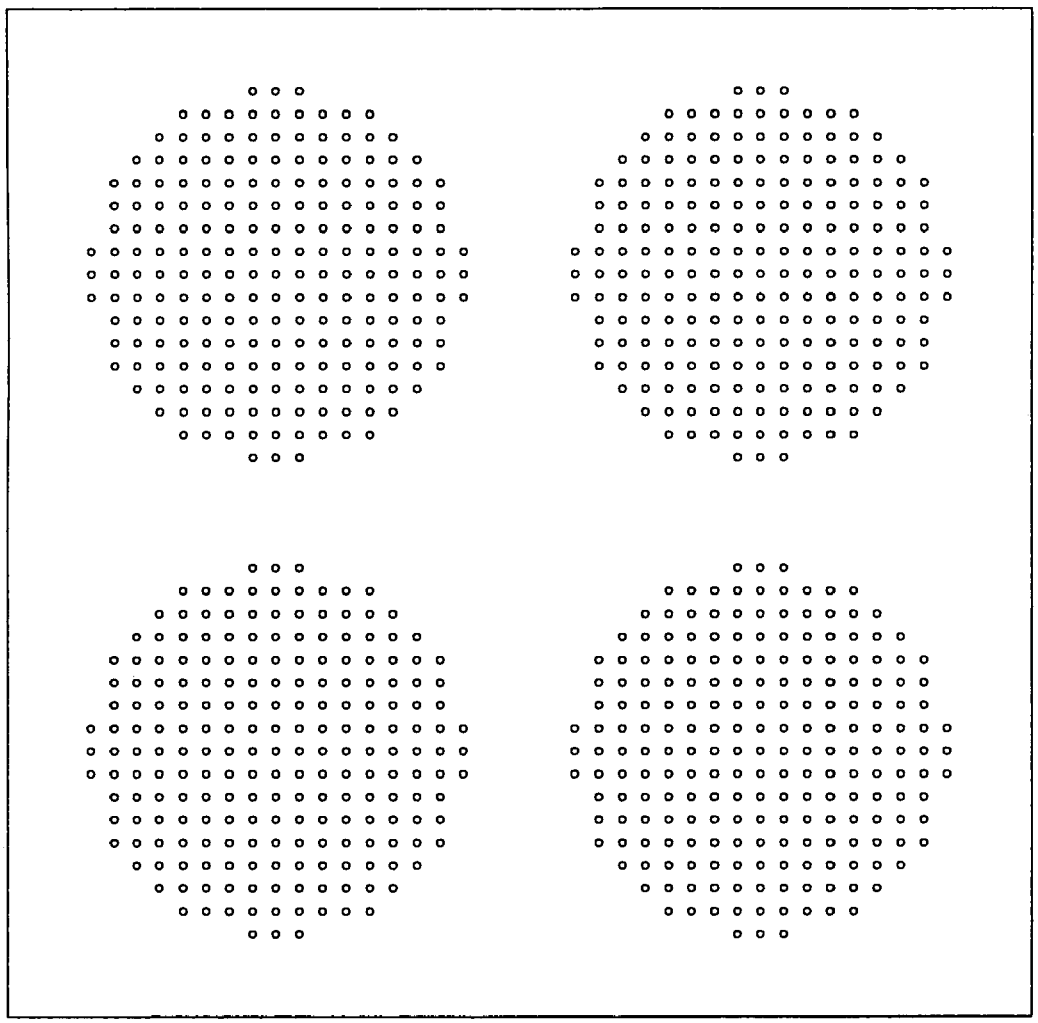
FIG. 20 shows a plan view of an adaptive membrane structure that has four subsections and each subsection has an array of holes.

One example of an adaptive membrane structure that has several such subsections is illustrated in FIG. 20. The figure shows a plan view of a membrane that has four subsections, and each subsection consists of an array of holes. Two or more membranes such as the membrane illustrated in FIG. 20 can be provided in the structure such that the array of holes in each subsection of one membrane are substantially out of registration, or are out of registration, with the array of holes of the corresponding subsection on another adjacent membrane. A separate actuating stimulus, and means responsive thereto, can be provided for each subsection of a membrane. For example, in an embodiment where the actuating stimulus is an applied electrical field, each of the four subsections may have its own conductive features that may or may not be connected to the conductive features of the other subsections in the membrane. By assembling the membrane illustrated in FIG. 20 with at least one and possibly more corresponding membranes and with appropriate spacers, and by connecting the resulting adaptive membrane structure to an appropriate electrical circuit, it is possible to apply an actuating stimulus to any one, any two, any three or all four of the subsections of the membrane structure. In so doing, they will be able to demonstrate at least 5 different states of permeability for such an adaptive membrane structure with four subsections.

The membrane of FIG. 20 is shown having four similar subsections. However, the individual membranes in a structure need not have exactly the same subsections. An adaptive membrane structure may be assembled such that the individual subsections of one membrane are completely different from other subsections on the same membrane as long as the corresponding subsections on adjacent membranes have arrays of holes that are substantially out of registration, or are out of registration, with each other.

A membrane with multiple subsections may be formed by creating an array of holes for each subsection on a single continuous sheet of material. A membrane comprising several subsections may also be formed by first creating individual subsection membranes and then joining the subsections to create a larger sheet or layer. The subsections may be joined to each other using reactive or non reactive adhesives or using different welding techniques such as radio frequency welding, ultrasonic welding and vibration welding.

Figure 13A:
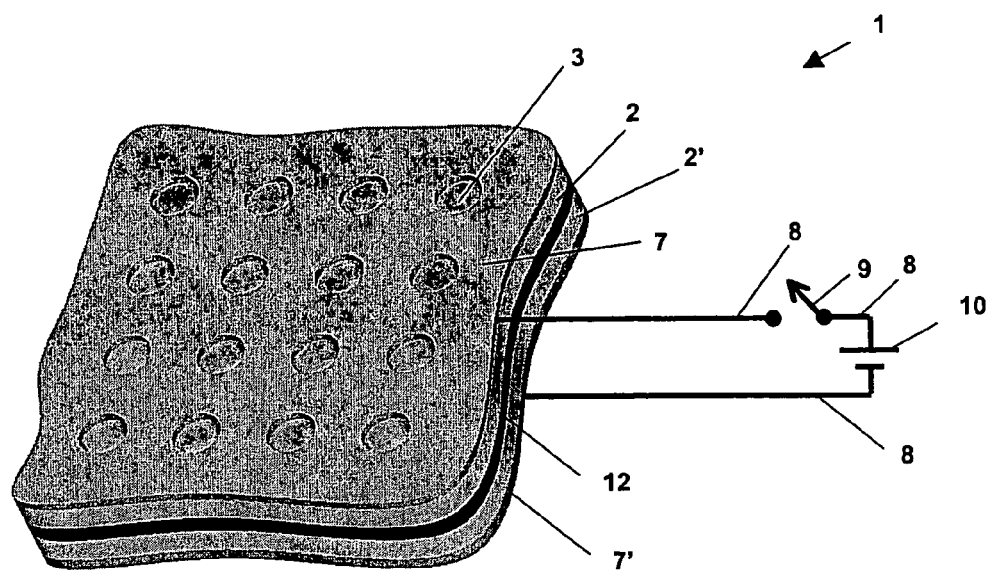
FIG. 13 is a schematic diagram of an unactuated adaptive membrane structure that includes a spacer material as a deactuation means. (13A: perspective view. 13B: plan view. 13C: sectional view.)
Figure 13B:
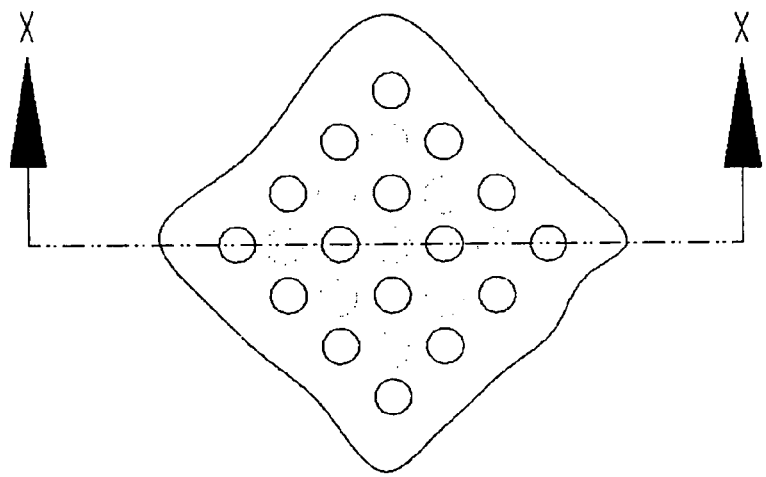
Figure 13C:
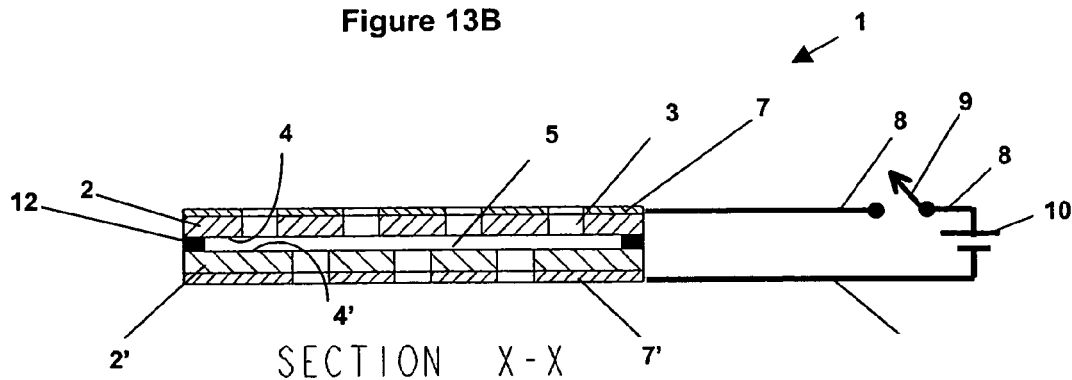
Figure 14A:
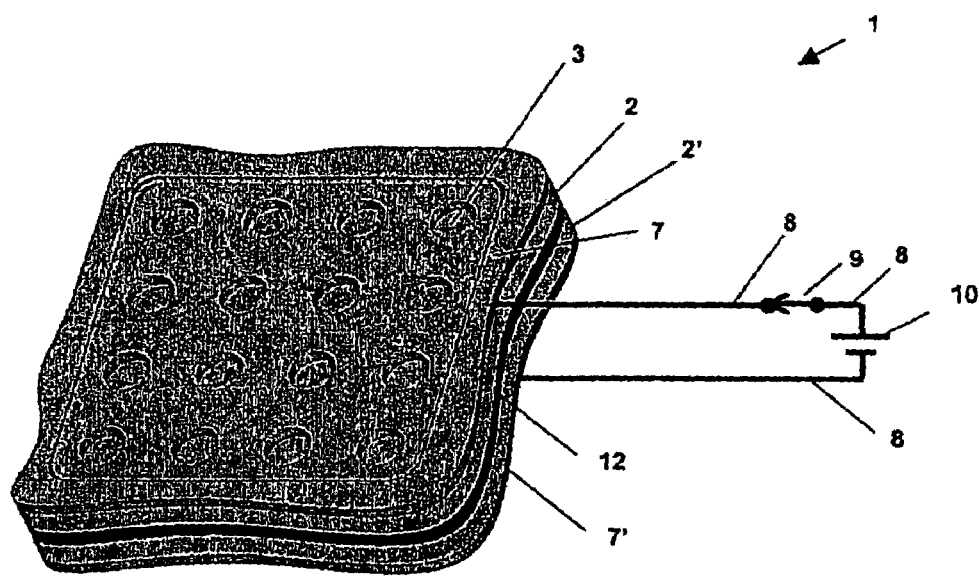
FIG. 14 is a schematic diagram of an actuated adaptive membrane structure that includes a spacer material as a deactuation means. (14A: perspective view. 14B: plan view. 14C: sectional view.)
Figure 14B:
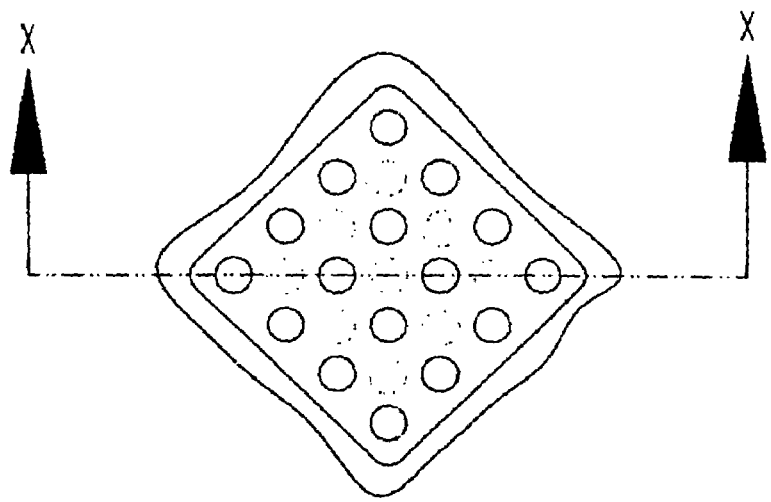
Figure 14C:
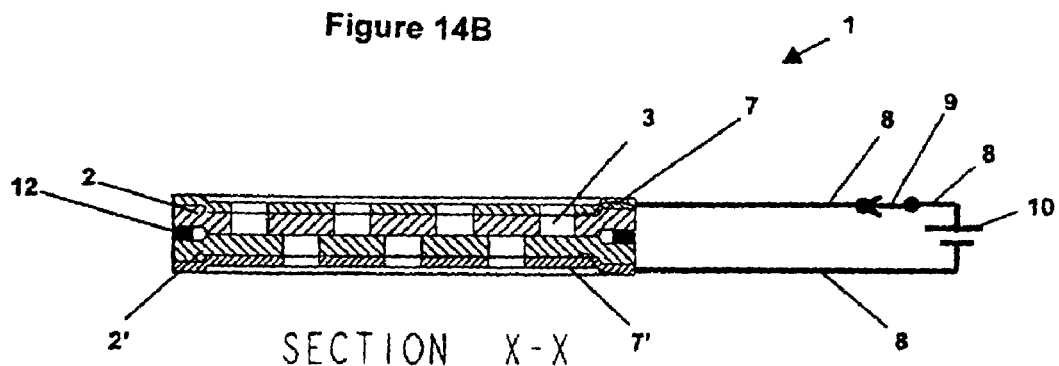

A further feature of the invention is a means of keeping adjacent membranes spaced apart during any time when the actuating stimulus is not applied or operating to move the membranes into contact with each other. This will produce a gap between the adjacent surfaces of the membranes to enable permeation through the structure as described above. In FIGS. 13A and 13C, a gap 5 between adjacent surfaces 4 and 4' is shown, and a spacer material 12 is installed between the adjacent membrane surfaces 4 and 4', the spacer material being of a shape that it does not block the openings to any holes of either membrane surface and has a thickness that results in the formation of the gap between the adjacent membrane surfaces. Upon application or operation of the actuating stimulus, one or both of the adjacent membranes undergo elastic deformation as depicted in FIGS. 14A, 14B and 14C such that the adjacent surfaces are brought together to provide contact between the adjacent surfaces and seal the holes thereof, in the manner described above (compare items 7 and 7' in FIGS. 13C and 14C). In this context, moreover, the actuating stimulus and the means responsive to the actuating stimulus may be viewed together as means for deforming a membrane to move it into contact with another membrane when a spacer is present between the two membranes. Upon release of the actuating stimulus, however, the elastic energy stored in the deformed membranes is recovered, and the membranes return to their initial position as shown in FIGS. 13A, 13B and 13C whereby the gap 5 between the adjacent membrane surfaces is restored. This ability to facilitate reformation of the gap 5 after removal of the actuating stimulus is a further characteristic of this invention and is termed the "deactuating means".

Figure 15A:
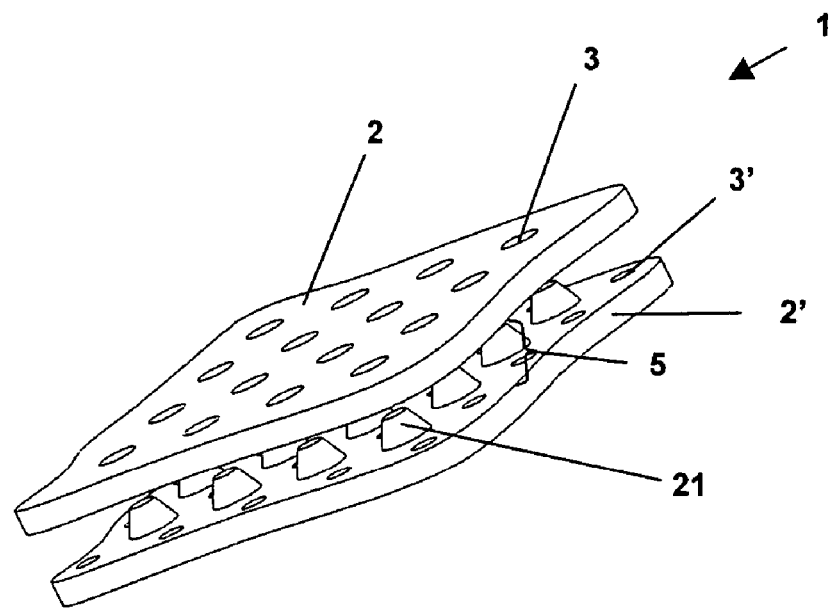
FIG. 15 is a schematic diagram of an adaptive membrane structure comprising an array of protruding features, in the unactuated state (15A: perspective view. 15B: sectional view.).
Figure 15B:
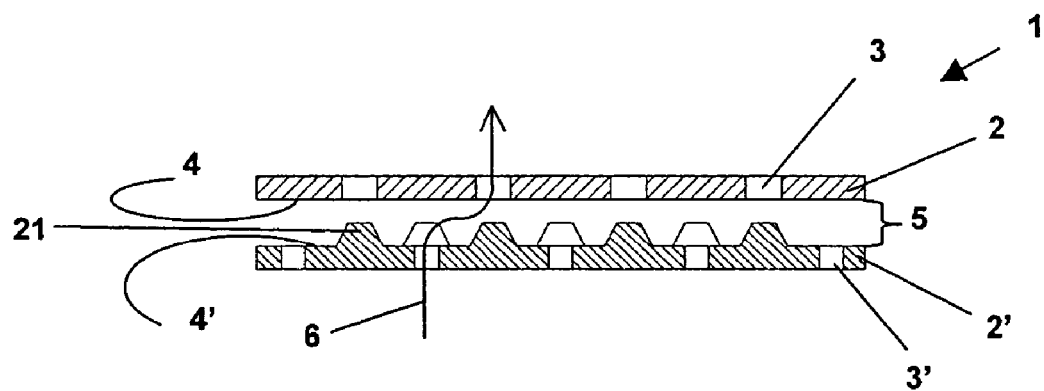
Figure 16A:
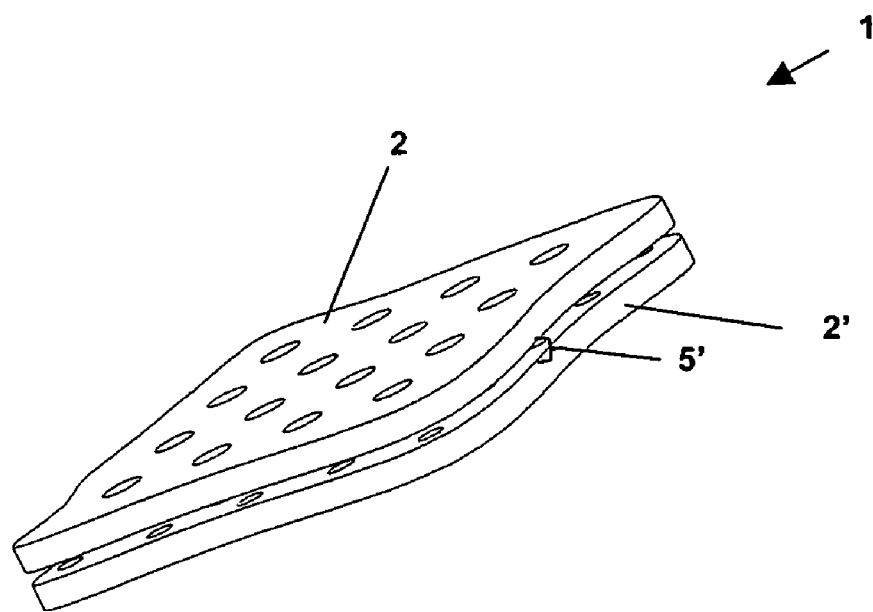
FIG. 16 is a schematic diagram of an adaptive membrane structure comprising an array of protruding features, in the actuated state (16A: perspective view. 16B: sectional view.)
Figure 16B:
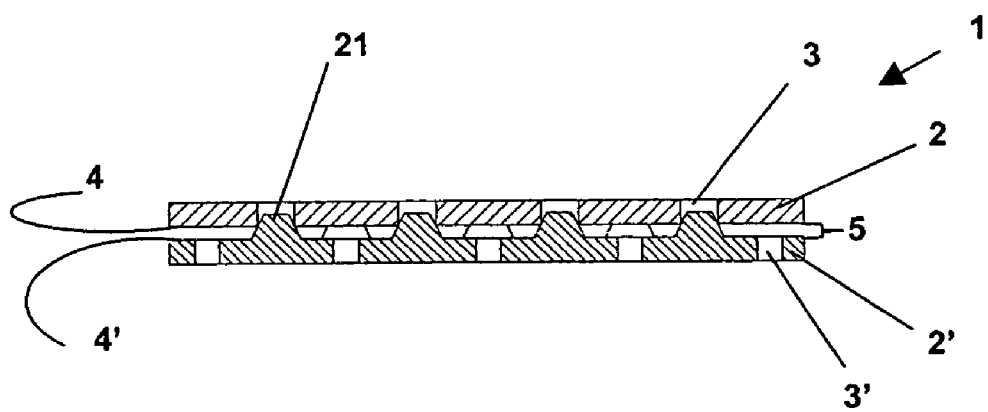

Embodiments of the present invention as described above, those for example shown in FIG. 1, involve at least two largely planar membranes that, as a result of being moved by the actuating stimulus, contact each other along adjacent, largely planar, surfaces 4 and 4' and thereby eliminate a gap 5 that had existed between these surfaces in the unactuated state. The contact of the membranes also eliminates paths such as path 6 that, in the unactuated state, would permit enhanced permeation, convection and/or diffusion associated with the array of holes incorporated in the base membranes. An alternative embodiment for the adaptive membrane structure of this invention is shown in FIGS. 15 and 16 in the unactuated and actuated states, respectively. In this embodiment, one or both of two adjacent base membranes contain an array of protruding members 21 in the form of a post, knob or bump. In the unactuated state of this embodiment, depicted in FIG. 15, the adjacent base membranes are separated from each other such that paths for enhanced permeation, convection and/or diffusion such as path 6 exist. However, as shown schematically in FIG. 16, each protruding member 21 in the array is shaped and positioned so as to be insertable in and enter a hole in the adjacent membrane upon actuation when one or both membranes are moved toward each other. As each protruding member enters its corresponding hole, it contacts the inner surface of the hole in such a way as to create a seal between the protruding member and its mating hole, thereby eliminating paths 6 for permeation, convection and/or diffusion. As seen in FIG. 16, in this embodiment, the adjacent membrane surfaces 4 and 4' need not be in contact under application or operation of the actuating stimulus and, furthermore, a gap 5 between these surfaces may persist in the actuated state. Although the protruding member 21 is shown as a truncated cone in FIGS. 15 and 16, other shapes for the protruding member may be used, limited only by the need to form a seal against the mating hole surface. Furthermore, although FIGS. 15 and 16 depict an array of identical protruding members deployed in a regular square pitch array, no two protruding members in the array need have identical geometry, and the array pattern for the protruding members is governed by the array pattern of the holes in the adjacent membrane.

The adaptive membrane structures of this invention can be used as components of articles of apparel, especially for clothing intended to protect against chemical and biological toxins and pathogens. Such articles include without limitation those selected from the group consisting of a protective suit, a protective covering, a hat, a hood, a mask, a gown, a coat, a jacket, a shirt, trousers, pants, a glove, a boot, a shoe, a shoe or boot cover, and a sock.

The adaptive membrane structure of this invention can also be used in consumer apparel to protect against the natural elements. In one embodiment, the structure can be used as an inner liner in responsive outerwear apparel used for recreational and other outdoor activities, such that the liner could be made to change its permeability depending upon external temperature and wind conditions, so as to increase the comfort of the wearer. Examples of such outerwear include without limitation coats, jackets, ski pants, gloves, hats, hoods and masks. In another embodiment, a membrane structure of this invention could be used as a responsive liner in raingear. In dry external conditions, the liner would be highly permeable, thus breathable, but in wet and rainy conditions, the liner would be made impermeable to external precipitation.

The adaptive membrane of this invention could be used for various medical applications. In one embodiment, the structure could be used to fabricate items of apparel for health care workers, including without limitation surgical masks, medical or surgical garments, gowns, gloves, slippers, shoe or boot covers, and head coverings.

For some of the aforementioned applications, the adaptive membrane structures of this invention may be used in the absence of any additional porous material layers, while for some other applications a multi-layered system may be created where the adaptive membrane structure forms only one component in the multi-layered system. Examples of porous layers that could be used in conjunction with the adaptive membrane structure are woven fabrics, non-woven films and porous membranes. Additional porous layers may be used with the objective of (i) creating a composite system that protects the adaptive membrane structure from an environment that may degrade its performance, and (ii) creating a composite system that has more features than those that can be offered by the adaptive membrane structure itself.

For example, for the purpose of creating fire retardant apparel that also protects a firefighter from noxious fumes and vapors, the adaptive membrane structure of this invention can be layered with or sandwiched between fire retardant fabrics. In this case, the outer fire retardant fabric protects the wearer and the adaptive membrane structure from the fire. For the purpose of creating commercial apparel that protects against the natural elements, the structure of this invention may be sandwiched between woven fabrics. The outer and the inner fabric may be chosen to impart a comfortable feel as well as to provide a fashionable appearance to the apparel. Colored and patterned fabrics may also be used as outer layers to introduce additional camouflage feature to chemical and biological protective apparel for the soldier. In some cases, microporous membranes may be used to protect the adaptive membrane structure from dust and liquids.

An adaptive membrane structure of this invention may be incorporated into an article of apparel by any of the knitting, sewing, stitching, stapling or adhering operations known in the art. It is common in the art to use fabrics or other materials having multiple layers from which to make apparel, and the structure of this invention can be incorporated therein by conventional methods.

The potential uses of the adaptive membrane structure of this invention are numerous and are not limited to protective apparel for humans. In other embodiments, the adaptive membrane structure of this invention can be used to create or construct an enclosure for the occupancy of humans, animals or perishables. Such enclosure would include for example collective shelters, such as tents, that protect groups of individuals against chemical and biological warfare agents. In another embodiment, the invention could be used to set up safe rooms in commercial and residential buildings. For example, the safe rooms assembled using the adaptive membrane of this invention would be permeable under non-threatening conditions but would become impermeable when toxic agents are released in the external environment.

The adaptive membranes of this invention may also be used to create an external water barrier layer in the construction of commercial and residential buildings such as dwellings and office buildings. The vapor barrier, or vapor-retardant layer, in a building should be impermeable enough to prevent precipitation from outside of the building to permeate inside, but yet should be breathable enough to allow excess moisture in the walls to permeate to the outside. Therefore, in one embodiment, the adaptive membrane of this invention may be used as a responsive vapor barrier in commercial and residential buildings such that the barrier layer can exist in multiple states. When there exists excess moisture in the building walls, the barrier layer would be made vapor permeable, and when there is high humidity in the external environment, the barrier layer would be made impermeable.

Adaptive membranes of this invention, when constructed from transparent polymer films, could also be used to construct agricultural and horticultural greenhouses. Temperature control in a greenhouse is an important issue for optimum plant growth. Existing greenhouses are constructed from polymer films of low gas and vapor permeability. Since such polymer films are not breathable, the temperature in a greenhouse is conventionally controlled by the opening and closing of engineered vents. This often leads to undesirable temperature gradients in the greenhouse. If an adaptive membrane structure is used to construct the greenhouse, the internal temperature could be more evenly controlled by changing the permeability of the membrane that envelops the greenhouse. As the temperature in the greenhouse rises, the membrane could be made more permeable, thereby allowing the process of free convection to reduce the temperature in the greenhouse. Similarly, as the temperature in the greenhouse falls, the membrane could be made less permeable, allowing the temperature in the greenhouse to rise.

In yet another embodiment, an adaptive membrane structure could be used in temporary, soft-walled construction, or in permanent construction, to create a clean room in which to perform surgical procedures, or in which to conduct activities requiring high air purity such as computer chip fabrication.

The adaptive membrane of this invention can also be used for managing the environment in small and large storage areas and containers such as those used for storing perishables, which include not just edible materials but any material that is sensitive to, or may be damaged or degraded by exposure to, the environment. For example, edible materials such as fresh fruits and vegetables may need to be stored under optimum humidity levels to maintain freshness and enhance their shelf life. Adaptive membranes of this invention could be used to create storage areas or storage containers that respond to the local environment conditions. For example, when the local water vapor concentration in the stored area is above the desired level, the adaptive membranes will deactuate to release excess water vapor to the surrounding environment, and will actuate once the water vapor drops below the desired level. Such responsive storage devices could be used to ship edible materials or other perishables from one place to another or to store them in commercial and residential settings such as cold storage areas and refrigerators.

Adaptive membrane structures of this invention can also be used to enhance the life and performance of a sensor device, and in this sense a sensor device may be viewed as a perishable. The active components in a sensor device are very sensitive to their environment and can be poisoned by liquid or vapor or particulate species in the environment. Such devices can also be corrupted when exposed to high concentrations of the species they are designed to sense. In one embodiment, an adaptive membrane structure, by its ability to have different states of permeability in the actuated and the deactuated states, can be used to control the flow of species to an enclosure housing the active component of a sensor. In another embodiment, an adaptive membrane structure can be used as a protective layer or a shroud around the active component. For this application, when it is desired that the sensor be in the active state for sensing, the adaptive membrane structure may be left in the unactuated state allowing the active component of the sensor to come in contact with species in the environment that need to be sensed. But when the sensor is no longer in the active or sensing state, the adaptive membrane structure can be deactuated to the closed state thereby protecting the active component of the sensor and enhancing its life.

An adaptive membrane structure may also be used for controlling the flow of a gas, vapor, liquid and/or particulate such as in valve and airfoil applications. The structure can be used to modulate the flow of a gas entering a plenum as encountered in heating, air conditioning and ventilation systems as well as plenums encountered in industrial processes such as the quench system of a fiber spinning process. In these applications, the gas flow to be modulated is largely normal to the membranes of the structure, and the flow rate is altered by changing the magnitude of the force of that flow, as the actuating stimulus, and thereby altering the resistance to flow of the structure. In addition, the structure can be used to modulate the lift experienced by various airfoils including those used as sails on sail boats, wind surfers, and other wind powered water craft as well as wings used on powered and un-powered aircraft. In these applications, the gas flow is largely tangential to the membranes of the structure that comprises or is incorporated into the airfoil, and the lift is altered by changing the magnitude of the force of the flow, as the actuating stimulus, thereby altering the pressure differential across the airfoil.

An adaptive membrane structure can also be used as a valve to control the rate of release of a vapor, aerosol or liquid, such as those used as fragrance compounds, perfumes, room fresheners, insecticides, pesticides or pharmaceuticals. In one embodiment, a controlled release device would include an adaptive membrane structure, which would separate the agent to be released from the surrounding environment. When the structure is in the deactuated state, the agent would be released to the environment by means of diffusion and or convection. However, when the structure is in the actuated state, transport of the agent to the environment would be reduced or stopped. The rate of release of the agent would be controllable by adjusting the frequency with which the structure in the controlled release device is oscillated between the actuated state and the deactuated state.

The use of an adaptive membrane structure of this invention in connection with physical assets or devices such as enclosures, buildings, sensors and valves can be achieved by fabrication and construction methods known in the art. The adaptive membrane structure may be interleaved between other layers or structural elements such as when a building wrap is installed between the interior and exterior portions of a wall. Or when the adaptive membrane structure is used in an essentially free-standing application such as in a tent, greenhouse, valve or protective cover for a sensor, installation may be achieved by anchoring it to a suitable frame.

The use of the adaptive membrane structure of this invention for valve purposes enables a method for controlling the flow of gas, vapor, liquid and/or particulates through first and second membranes having holes by (a) providing the holes in each membrane in a position in which, when the membranes are in contact with each other, the holes are substantially out of registration, or are out of registration, and (b) moving the membranes into contact with each other.

EXAMPLES

The present invention is further defined in the following examples. It should be understood that these examples, while indicating preferred embodiments of the invention, are given by way of illustration only. From the above discussion and these examples, one skilled in the art will be able to ascertain the essential characteristics of this invention, and, without departing from the spirit and scope thereof, will be able to make various changes and modifications of the invention to adapt it to various uses and conditions.

Example 1

This example describes an apparatus and method for testing and demonstrating the performance of the adaptive membrane structures of the invention. The multiple states of permeability of the structures are demonstrated by measuring the ratio of the oxygen permeability in the unactuated state and the actuated state.

Figure 17A:
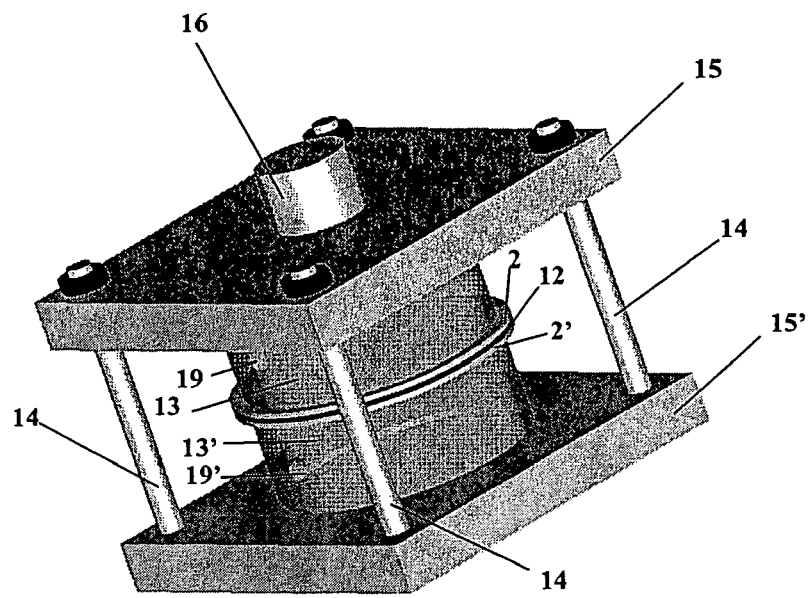
FIG. 17 is a schematic diagram of the cell used in measuring the oxygen permeability of the adaptive membrane structures (17A perspective, 17B section).
Figure 17B:
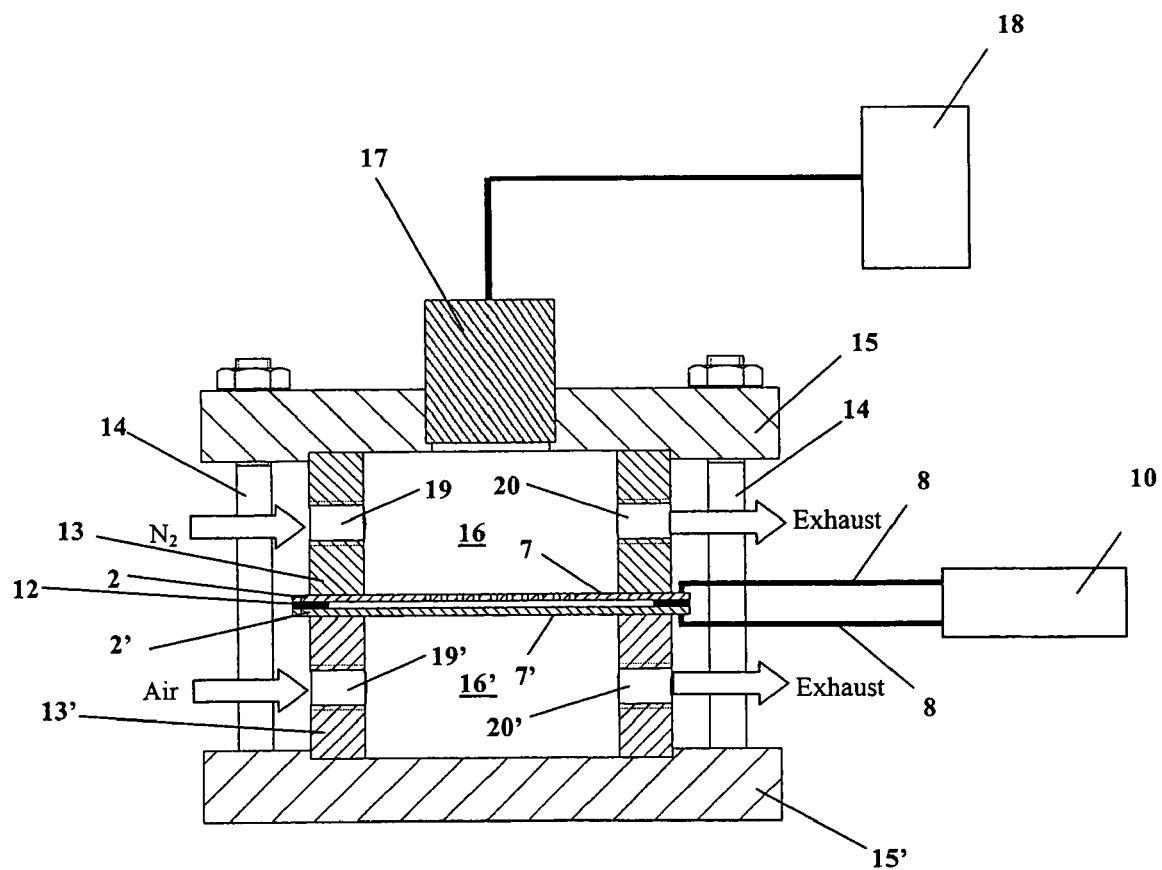

Oxygen ($O_2$) permeability of an adaptive membrane structure is tested in a gas permeability cell, a schematic of which is shown in FIGS. 17A and 17B. This system may be used to test any of the embodiments of the invention described above. For this example, an adaptive membrane structure of the general type shown in FIG. 13 is depicted comprising two substrate membranes 2 and 2' each modified with an array of holes per the invention and with conductive coatings 7 and 7' and spacer material 12. The membrane assembly is clamped between two cylindrical, clear acrylic pieces 13 and 13' as shown in FIGS. 17A and 17B. The length of each cylindrical piece is 1" and its inner diameter and outer diameter are 2.25" and 3", respectively. The two cylindrical pieces are held together by a metallic frame comprising four metal tie rods 14 and two metal plates 15 and 15' that provided complete closure to the permeability cell except for gas ports as described below. The cylindrical pieces 13 and 13' together with the plates 15 and 15' and the adaptive membrane structure combined to define two gas volumes 16 and 16' as seen in FIG. 17B. An electrochemical oxygen ($O_2$) sensor 17 with associated electronics 18 (Model GC-501, VICI Metronics, Poulsbo, Wash.) capable of measuring $O_2$ concentrations in the range of 0.1-25 mol %, is mounted on one of the metal plates 15 such that the active surface of the sensor is exposed to the gas volume 16, thereby monitoring the $O_2$ concentration in this volume of the permeability cell; this volume is referred to herein as "the low concentration side of the permeability cell." The other gas volume of the cell, 16' (which does not have an $O_2$ sensor) is referred to herein as "the high concentration side of the permeability cell."

After the membrane assembly has been mounted in the permeability cell, the two conductive coatings 7 and 7' are connected, via conductive electrical wires 8 fitted with alligator clips, to the output of a high voltage DC power supply 10 (Model SL10, Spellman High Voltage Electronics Corporation, Hauppauge, N.Y.) capable of delivering tunable but constant DC voltage between 100 volts and 10,000 volts. During the initial part of the experiment, when $O_2$ permeability of the membrane structure in the unactuated state is being measured, the power supply is not energized.

At the start of the experiment, designated as time zero, a flow of air (consisting of 20.9 mol % $O_2$) is initiated to the high concentration side of the permeability cell 16' through inlet port 19' and a flow of nitrogen ($N_2$ at 99.9% purity) is initiated to the low concentration side 16 of the permeability cell through inlet port 19. Each half of the cell also includes an exhaust port (20 and 20' in FIG. 17B), each providing free discharge from its respective gas volume to ambient conditions. The flow rate of both gases is controlled by separate inline rotometers upstream of the inlet ports 19 and 19'. Care is taken to keep the flow rates of both gases to the two half cells the same and constant during an experiment. The $O_2$ concentration in the low concentration side of the cell 16 is then monitored as a function of time. Note that before the start of the experiment, both halves 16 and 16' of the permeability cell always contain ambient air.

At the start of the experiment, when $N_2$ flow is initiated to the low concentration side of the cell 16, the air, and hence the residual $O_2$ present in the half cell, is displaced by $N_2$. Hence, the $O_2$ concentration in the gas volume 16 drops with time, and after 15 minutes reaches an essentially constant level dependent upon the permeability of the unactuated membrane structure. This constant $O_2$ level indicates that a steady state between the rate of influx of $O_2$, caused by the permeation of air through the membrane assembly to the low concentration side of the cell 16, and the rate of efflux of $O_2$ through port 20, caused by forced convection out of the low concentration side of the cell, have been achieved.

After 15 minutes have elapsed from the start of the experiment, a known potential difference is applied across the conductive coatings 7 and 7' from power supply 10. For the initial few seconds after the voltage is applied to the circuit, a very small current in the range of a few microamperes is always detected by the ammeter installed in the high voltage source. After the first few seconds, current is no longer detected in the circuit thus indicating that the conductive coatings 7 and 7' have become saturated with electrostatic charge. The voltage source, and consequently the membrane structure connected to the source, is left in the actuated state for 15 minutes. During this time, the change in the $O_2$ concentration in the low concentration side 16 of the permeability cell is monitored. Once the membrane structure is actuated with the applied voltage, the oxygen concentration in the low concentration side of the cell 16 further drops and reaches a constant value depending upon the permeability of the membrane structure in the actuated state.

After the membrane structure has been in the actuated state for 15 minutes, the voltage source is turned off, and any residual charge in the circuit is drained to ground via the voltage source. After the voltage is turned off, the membrane structure is allowed to stay in the unactuated state for another 15 minutes, during which time the change in oxygen concentration in the low concentration side 16 of the permeability cell is monitored.

The performance of the adaptive membrane structure is quantified by calculating the ratio of the $O_2$ permeability of the membrane assembly in the unactuated state to the permeability of the same membrane assembly in the actuated state. This ratio, referred to herein as the figure of merit of the membrane assembly, is calculated from the following equation $$\frac{K_{unactuated}}{K_{actuated}} = \frac{\left(\frac{x_1}{x_o - 2x_1}\right)_{unactuated}}{\left(\frac{x_1}{x_o - 2x_1}\right)_{actuated}}$$

where K is the oxygen permeability of the adaptive membrane structure, the subscript defines the state of the membrane structure (actuated or unactuated), $x_o$ is the concentration of $O_2$ in air, and $x_1$ is the concentration of $O_2$ in the low concentration side 16 of the cell when steady state has been achieved. This equation is derived by conducting a material balance of $O_2$ on both halves of the permeability cell and by assuming that the concentration of $O_2$ in the respective efflux gas streams at ports 20 and 20' is the same as that existing within the corresponding gas volumes 16 and 16' of the cell. This equation typically also provides an indication of permeability that is generally useful in all systems.

Example 2

Polyethylene terephthalate film, referred to herein as polyester film, sold under the trade name of Melinex® by DuPont Teijin Films, having a thickness of 196 gauge (0.00196"), is coated on one side with a thin layer of aluminum using a chemical vapor deposition process. The electrical resistance of a 2.5" long by 2" wide piece of aluminum-coated polyester film is measured using a two point probe apparatus. The resistance of the film is approximately 4 Ohms. The surface of the film that includes the aluminum coating will be referred to as the conductive surface while the other surface that does not have the aluminum coating will be referred to as the non-conductive surface. Two circular (4" in diameter) pieces of this polyester film are converted to a pair of membranes following the invention by punching holes through the polymer film and the conductive coating thereof. The diameter of the holes is 0.04". Holes are punched using a VIPROS 345 turret punching machine manufactured by U.S. Amada Ltd. (Buena Park, Calif.). The direction of the punching is from the non-conductive surface of the polyester film towards the conductive surface. Hence any raised surface features caused by the punching process are predominantly on the conductive surface of the polyester film.

In the first membrane, a total of 84 holes are punched while in the second membrane 83 holes are punched. The hole pattern in both membranes is a regular square pitch pattern, with center-to-center distance between any two nearest neighboring holes being 0.111 inch. The hole pattern in each membrane covered 1"×1" square area in the central region of the circular film. A major difference between the two membranes is that the hole pattern in one membrane is offset from the hole pattern in the other membrane by a distance that is half of the center-to-center distance between neighboring holes. This offset is created in both the x axis and the y axis, where x and y axis are orthogonal to each other and exist in the plane of the membrane. Thus, when the two membranes are precisely laid on top of each other, all the holes in one membrane are out of registration with all the holes in the other membrane.

An adaptive membrane structure is created by sandwiching a spacer according to the invention (see FIG. 13) between the two membranes described above. In particular, the spacer is formed from a stack of two annular rings each ring having a thickness of 0.004" and an inner diameter and an outer diameter of 2.25" and 4", respectively. One function of the spacer is to create a finite gap between the membranes and to prevent them from touching each other in the absence of the application or operation an actuating stimulus. Another function of the spacer rings is to provide a deactuating force to the membrane structure when the voltage is turned off. The spacer rings are created from transparent polyethylene terephthalate films sold under the trade name of Mylar® by DuPont Teijin Films. The two membranes with conductive coatings and punched hole arrays are stacked such that their non-conductive surfaces face each other, and consequently the conductive surfaces face away from each other. This adaptive membrane structure is tested for oxygen permeability, in the unactuated and actuated states, using the method described in Example 1.

First, the oxygen permeability of the membrane assembly in absence of applied voltage is tested. After 15 minutes, a potential difference of 1000 V is applied across the two conductive coatings on the membranes. When the voltage is applied, the membranes are observed to move, indicating the effect of an actuating stimulus in the form of the induced voltage. The membrane structure is left in the actuated state for 15 minutes, and the changes in the $O_2$ concentration in the low concentration side of the cell is monitored.

The voltage is then turned off, and any residual charge is drained from the membrane assembly. A few seconds after the voltage source is turned off, the membranes are observed to move apart, indicating the disappearance of any actuating stimulus that has previously moved the membranes towards each other. The membrane structure is left in the unactuated state for 15 minutes and the resulting change in the $O_2$ concentration is monitored.

At the end of this time period, an actuating stimulus is again applied to the membrane structure in the form of a 1000 V charge. This repetitive cycle of turning on and then turning off the DC voltage source, and consequently charging the membrane structure with 1000 V and then discharging it every 15 minutes, is performed two more times. Each time the voltage is turned on or off, motion of the membranes is observed. The cyclical change in $O_2$ concentration in the low concentration side of the cell, caused by cyclical changes in the voltage-induced permeability of the membrane assembly, is monitored over the entire duration of this experiment.

Figure 18:
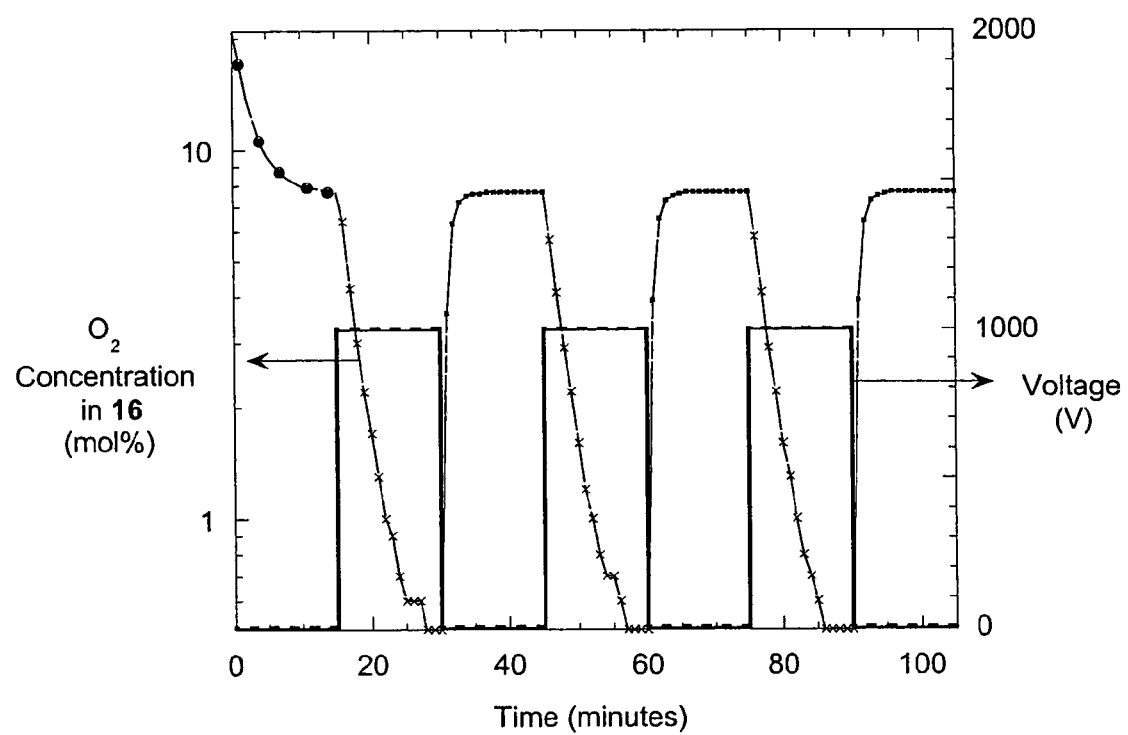
FIG. 18 is a graph of the $O_2$ concentration in the low concentration side of the test cell for an adaptive membrane structure in actuated (voltage on) and unactuated states (Example 2).

The change in $O_2$ concentration in the low concentration side of the cell, as the input voltage changes, is shown in FIG. 18. Also plotted in the figure is the cyclical change in the input voltage to the membrane circuit. The y-axis on the left hand side of the figure represents the changes in $O_2$ concentration in a logarithmic scale while the y-axis on the right had side of the figure represents the input voltage on a linear scale. The x-axis represents the elapsed time in minutes.

This example demonstrates that gas permeability of the adaptive membrane structure can be repeatedly changed by application of the applied voltage. When a potential difference is applied across the membrane structure and the membranes are electrostatically charged, the conductive coated membranes of this invention are moved toward each other and "close down" as indicated by the significant reduction in $O_2$ concentration in the low concentration side of the cell. Conversely, when the voltage is turned off and the electrostatic charge is drained from the membrane structure, the membranes "open up" as indicated by the significant increase in the $O_2$ concentration in the low concentration side of the permeability cell. The steady state $O_2$ concentration in the low concentration side of the cell, when the membrane structure of this example is in the unactuated state, is 7.7 mol %. Conversely, the steady state $O_2$ concentration on the low side of the cell, when the membrane structure is actuated by 1000 V, is only 0.5 mol %. Thus, the figure of merit of the adaptive membrane structure of this example, as calculated from the equation described in Example 1, is 56. It should be noted that if there is no change in $O_2$ permeability, when the membrane structure is actuated by voltage, the figure of merit would only be 1.

Example 3

A pair of membranes is prepared from the same polyester film with conductive coating that is used for membranes in Example 2. The size of the holes, the hole pattern and the hole spacing in the membrane pair of this example are the same as those in the membrane pair of Example 2. The only difference between the membrane pairs of this example and the membrane pair of Example 2 is that the holes in the membrane pair of this example are created by laser drilling using a Lambda Physik (Göttingen, Germany) excimer laser Model LPX 220I operating at a wavelength of 193 nm.

An adaptive membrane structure is created by sandwiching one polyester spacer ring, 0.004" in thickness as described in the previous example, between the two membranes. Note that the hole pattern in the two membranes is offset from each other, and when the membranes are assembled, the holes in one membrane are thus out of registration with the holes of the other membrane. Also, when the membranes are stacked in the assembly, the non-conductive surfaces are made to face each other. The membrane structure is mounted and tested in the oxygen permeability cell described in Example 1. After the membrane assembly has been tested for oxygen permeability in the unactuated state, a potential difference of 1000 V is applied to actuate the membrane assembly. After 15 minutes, the membrane structure is deactuated by turning off the voltage source and draining the electrostatic charge from the conductive membranes. The steady state $O_2$ concentration falls from 7.3 mol % in the unactuated state to 0.4 mol % when the membrane assembly is actuated by 1000 V. The $O_2$ concentration returns back to 7.3 mol % when the voltage is turned off. The figure of merit for this membrane assembly is calculated to be 58.

Example 4

Two rectangular pieces (6"×5") of the same polyester film with conductive coating used in Example 2 are washed for one hour in a 5 wt % aqueous solution of DuPont Oxone® monopersulfate compound, obtained from Aldrich Chemical Company, Inc. (Milwaukee, Wis.). This washing process completely removes the conductive coating from the surface of the films. The excimer laser apparatus, described in Example 3, is then used to drill holes into the uncoated polyester films. The diameter of the holes, the pattern of holes and the spacing between the holes is the same as created in the membrane pairs of Example 2 and Example 3.

Figure 19:
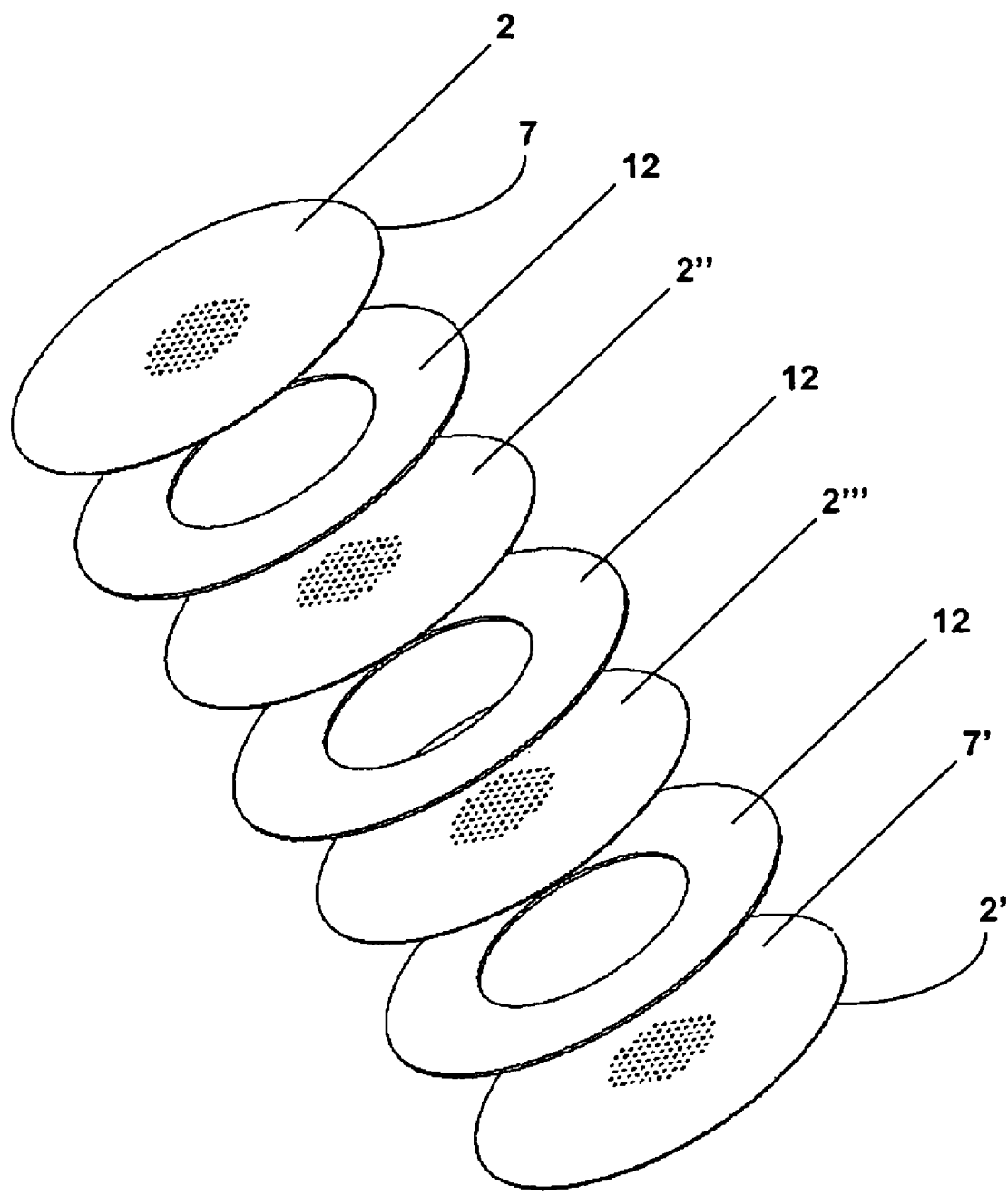
FIG. 19 is a schematic diagram of an exploded view of an adaptive membrane structure containing four membranes and three spacers, as described in Example 4.

The membrane pair with conductive coatings from Example 3, the uncoated membrane pair from this example and three polyester spacer rings (one between each adjacent membrane) are combined to form a membrane assembly comprising the four membranes. FIG. 19 shows the make up of the membrane assembly. When the assembly is created, care is taken to ensure that (i) all the holes in any given membrane are out of registration with all the holes of its nearest neighbor, and (ii) the membranes with conductive coatings formed the outer most layers in the assembly.

The oxygen permeability of this assembly in the unactuated state and the actuated state is tested using the permeability cell of Example 1. A potential difference of 1000 V, applied to the two conductive coatings of the outer membranes, is used to actuate the membrane assembly. The steady state $O_2$ concentration in the low concentration side of the cell, when the membrane is in the unactuated state, is 4.9 mol %, but when the membrane is in the actuated state, the steady state $O_2$ concentration is only 0.2 mol %. This shows that the membranes of this invention can be made to "close down" when an external voltage is applied. The figure of merit of the four-layer membrane of this example is calculated to be 50. This example also demonstrates that the adaptive membrane structures of this invention may contain more than two membranes, and that, when an electrostatic force is the actuating stimulus, membranes serving a useful purpose despite the fact that they do not have a conductive coating may be present.

Example 5

Two rectangular pieces (6"×5") of the polyester film with conductive coating described in Example 2 are punched on the VIPROS punching machine to form a pair of membranes, each with an array of 0.04" diameter holes. The holes are punched from the non-conductive side of the polyester films. One membrane has a total of 24 holes while the second membrane has 21 holes. The hole pattern in both membranes is a regular square pitch pattern, with center to center distance between any two nearest neighboring holes being 0.222". The hole pattern in each membrane covered 1"×1" square area in the central region of the circular film. As in Example 2, the hole pattern in one membrane is offset from the hole pattern in other membrane by a distance that is half of the center to center distance between neighboring holes. This offset is created in both the x axis and the y axis direction where the x and y axis are orthogonal to each other and are contained in the plane of the membrane. Thus, when the two membranes are precisely laid on top of each other, all the holes in one membrane are out of registration with all the holes in the other membrane.

An adaptive membrane structure is created by sandwiching four 0.004" thick polyester spacer rings between these membranes. The non-conductive surfaces of the membranes are assembled to directly face each other. The performance of the membrane assembly in the actuated state and the unactuated state is tested in the $O_2$ permeability cell of Example 1. The membrane assembly is actuated by 1000 V. When the membrane assembly is in the unactuated state, the steady state $O_2$ concentration in low concentration side of the cell is 5.5 mol %. In the actuated state, the steady state $O_2$ concentration is detected to be 0 mol %, which is below 0.1 wt %, the lowest 02 level detectable by the sensor. Hence, the figure of merit of this membrane assembly is essentially infinity, thereby indicating complete closure.

Example 6

Two rectangular pieces (6"×5") of 1 mil thick polyimide film, sold by DuPont (Wilmington Del.) under the trade name of Kapton®, are coated with Sylgard® 184, a two part silicone elastomer formulation sold by Dow Corning (Midland, Mich.). The elastomer formulation is prepared by mixing 97 parts of the polydimethylsiloxane (PDMS) polymer with 3 parts crosslinker. The resulting viscous liquid is coated onto the polyimide films using a #2.5 Drawdown Rod sold by Paul N. Gardner Company, Inc. (Pompano Beach, Fla.). The wet elastomer coatings are cured for 1 hour in a flow-through convection oven at 100° C. The cured elastomer layer made the polyimide films tacky on one side and hence allowed them to adhere to other smooth surfaces. A circular hole, 2" in diameter, is punched in the central region of each of the polyimide films. These films are then set aside to serve as stencils for coating polyester films as described below.

Two rectangular pieces (6'×5") of polyester film with conductive coating as described in Example 2, are washed in methanol to remove any residual oil or grease from the film surfaces. The dry films, with the conductive surface facing downwards, are laid on to a clean and smooth glass surface. The two elastomer-coated polyimide stencils, as described above, are laid over with the tacky surface facing the polyester films and then made to adhere to the non-conductive surfaces of the polyester films. Now only the 2" circular region in the center of each of the polyester films is exposed, while the other parts of the polyester films are covered with the polyimide films. The resulting bilayer films are coated with Elastosil® 6238 silicone elastomer formulation sold by Wacker Silicones (Munich, Germany). The formulation is prepared by mixing 97 parts of PDMS with 3 parts of the crosslinker. A #2.5 Drawdown Rod is used for creating a uniform coating. Immediately after the coating step, the polyimide stencils are carefully peeled away from the polyester films, thus leaving behind a 2" circular patch of a wet silicone elastomer coated on the nonconductive surface of each polyester film. The elastomer coating is cured at 100° C. for 1 hr. The average thickness of the cured elastomer layer is 0.0025".

Arrays of holes are added to the pair of elastomer coated polyester films by punching using the same machine used in Example 1. The hole diameter, hole spacing and hole pattern are the same as in the membrane pair of Example 2. Holes are punched from the elastomer-coated surface towards the conductive surface.

An adaptive membrane structure is created by sandwiching two 0.004" thick polyester spacer rings between the elastomer-coated membranes. The membranes are assembled such that the elastomer-coated surfaces are facing each other. The performance of the membrane is tested in the $O_2$ permeability cell of Example 1. The steady state $O_2$ concentration in the low concentration side of the cell, when the membrane assembly is in the unactuated state, is 7.7 mol %. When the membrane assembly is actuated by 2000 V, the steady state $O_2$ concentration drops to 0.1 mol %. The figure of merit of this membrane assembly is, therefore, calculated to be 290.

Example 7

A roll of polyvinylidene fluoride (PVDF) film, 0.003 inches in thickness, is obtained from Westlake Plastics Company (Lenni, Pa.). One surface of this PVDF film is very smooth while the other surface is rough. Two rectangular pieces (6"×5") are cut from the PVDF film roll and washed in methanol. The films are then heat treated by placing them in a heated convection oven at 120° C. for 1 hour. The rough sides of the films are then made electrically conductive by depositing an aluminum layer using a chemical vapor deposition process. The thickness of the aluminum layer could not be measured accurately because of the inherent roughness of the PVDF film surface. However, sufficient aluminum is deposited such that the resulting film became optically opaque, and they offered electrical resistance of a few ohms when electrodes of a multimeter are placed 4" apart at the edges of the metallic surface of the aluminum coated PVDF film.

Arrays of holes are added to the pair of PVDF films with conductive coatings by laser drilling using the excimer laser described in Example 3. Holes are drilled from the smooth surface of the PVDF films. The size of the holes, the spacing of the holes and the hole pattern in the membranes is the same as used for the membrane pair in Example 2. After the drilling step, each PVDF membrane is sandwiched between the optically flat and mirror smooth surfaces of two silicon wafers. The sandwich thus created is placed between the heated plates of a hydraulic press. The temperature of the plates is held at 120° C. When the silicon wafers have reached a steady state temperature, the wafer sandwich is compressed for 2 minutes at an applied stress of 314 lb/in$^2$. This compression process helps to reduce surface deformities in the membranes that may have been created by the laser drilling process.

An adaptive membrane structure is created by sandwiching two 0.004" thick polyester ring spacers between the PVDF membranes. In the membrane assembly, the non-conductive surfaces of the PVDF membranes directly face each other. The membrane assembly is tested in the $O_2$ permeability cell of Example 1. The steady state $O_2$ concentration in the low concentration side of the cell, when the membrane assembly is in the unactuated state, is 7.8 mol %. When the membrane assembly is actuated by 1000 V, the steady state $O_2$ concentration dropped to 0.2 mol %. The figure of merit of this membrane assembly is calculated to be 151.

Example 8

This example describes a lithographic method for printing discrete electrically conductive features onto a flexible polymer film. The electrical circuit or artwork that is to be printed onto a flexible polymer film is first transferred to a negative photomask. A 0.002" thick polyimide film having a thin conductive copper coating on one side of the film, sold under the trade name of Pyralux®™ by DuPont (Wilmington Del.), is used as the substrate onto which the conductive circuit is to be printed.

This flexible conductive film is sequentially washed in (i) Versa-Clean® 415 solution (Fisher Scientific International Inc., Hampton, N.H.) at 45° C., (ii) deionized water at room temperature, (iii) Sure Etch 550 acidic copper etchant (Dayton Superior, Kansas City, Kans.) at 35° C., and (iv) deionized water at room temperature. The clean copper surface of the flexible conductive film is then laminated to a Riston® 9415 photoresist film using a Vacrel® SMVL-100 vacuum laminator (both from DuPont). The negative photomask is laid on top of the photoresist film, and the photoresist is then exposed to ultraviolet light in a Riston® PC printer 130. The total energy density for the exposure is 100 mjoule/cm$^2$.

The exposed film/photoresist laminate is now developed in a Chemcut System CS-2000 developer (Chemcut Corporation, State College, Pa.) at a speed of 77 inch/minute. The developing solution consists of 1 wt % of sodium carbonate in deionized water. The temperature of the developing solution is 85° F. (29° C.). The developed film is then washed in a 5 wt % solution of DuPont Oxone® monopersulfate compound (Aldrich) in water until all the exposed copper from the polyimide surface had been stripped. In the final step, the photoresist layer is stripped by washing the polyimide film in 3 wt % solution of potassium hydroxide in water. All the features that are originally present in the negative photomask are now imprinted as conductive features on the polyimide film.

Example 9

This example demonstrates an adaptive membrane structure in which electrodes are formed from a network of discrete but interconnected electrically conductive lines that have been printed on the film surface using the lithographic process described in Example 8.

Two separate but matching circuit patterns, one for each membrane in the adaptive membrane structure, are drawn to the same length scale as desired in the final electrical circuit on the membranes. The circuit pattern for each membrane consists of 200 equal size circular rings printed in a regular face centered square pitch pattern and interconnected by straight lines to complete the electrical circuit as schematically depicted in FIG. 8. The inner diameter and outer diameter of the circular rings in the pattern are 0.051" and 0.070", respectively. The center-to-center distance between the nearest neighbors and the next nearest neighbors are 0.079" and 0.111", respectively. The circular rings are connected by 0.1 mm thick lines. The two circuit patterns are printed onto circular discs of Pyralux®™ film. The circuit pattern on one film is a mirror image of the circuit pattern on the second film. Hence, when the two patterns are precisely laid on top of each other such that the two film surfaces that supported the conductive features are directly facing each other, all 200 rings in one film precisely overlapped with all 200 rings in the other film.

The excimer laser described in Example 3 is now used to create an array of holes in the films with the matching circuit pattern. A total of 100 equal sized holes, 0.04" in diameter, in a 10 hole×10 hole regular square pitch pattern, are drilled in each film. All holes are drilled such the circular conductive features completely encircled each hole (see FIG. 8). The center to center spacing between any two neighboring holes is 0.111". The hole pattern in one membrane is offset from the hole pattern in the other membrane by a distance that is half of the center to center distance between neighboring holes. This offset is created in both the x axis and the y axis directions where the x and y axis are orthogonal to each other and are contained in the plane of the membrane. Thus, when the two membranes are precisely laid on top of each other, all the holes in one membrane are out of registration with all the holes in the other membrane.

An adaptive membrane structure is created by sandwiching two 0.004" thick polyester spacer rings between the pair of membranes. In the membrane assembly, the non-conductive surfaces of the membranes are made to face each other. The membrane assembly is tested in the $O_2$ permeability cell described in Example 1. In the unactuated state, the steady state concentration of $O_2$ in the low concentration side of the cell is 8.9 mol %. When the membrane is actuated by 2000 V, the steady state $O_2$ concentration dropped to 0.5 mol %. The figure of merit for the membrane assembly of this example is calculated to be 114.

Where an apparatus or method of this invention is stated or described as comprising, including, containing, having, being composed of or being constituted by certain components or steps, it is to be understood, unless the statement or description explicitly provides to the contrary, that one or more components or steps other than those explicitly stated or described may be present in the apparatus or method. In an alternative embodiment, however, the apparatus or method of this invention may be stated or described as consisting essentially of certain components or steps, in which embodiment components or steps that would materially alter the principle of operation or the distinguishing characteristics of the apparatus or method would not be present therein. In a further alternative embodiment, the apparatus or method of this invention may be stated or described as consisting of certain components or steps, in which embodiment components or steps other than those as stated or described would not be present therein.

Where the indefinite article "a" or "an" is used with respect to a statement or description of the presence of a component in an apparatus, or a step in a method, of this invention, it is to be understood, unless the statement or description explicitly provides to the contrary, that the use of such indefinite article does not limit the presence of the component in the apparatus, or of the step in the method, to one in number.

The invention claimed is:

1. An adaptive membrane structure comprising first and second membranes, and means to respond to an actuating stimulus that moves the first membrane into contact with the second membrane in a position in which the permeability of the structure to gas, vapor, liquid and/or particulates is decreased, wherein each membrane has an array of holes, and the holes of the first membrane are substantially out of registration, or are out of registration, with the holes of the second membrane, and wherein application of the actuating stimulus is effected by a a sensor, in response to a change in the concentration of an undesirable chemical, biological and/or particulate species, in the environment in which the structure is located.

2. The structure of claim 1 wherein the structure further comprises a third membrane having holes, and means to respond to an actuating stimulus that moves the third membrane into contact with the second membrane in a position in which the holes of the third membrane are substantially out of registration, or out of registration, with the holes of the second membrane.

3. The structure of claim 1 wherein one or both membranes have an electrically conductive coating on a surface thereof and the actuating stimulus is an electrostatic force and the means to respond is the electrically conductive coating.

4. The structure of claim 3 wherein the conductive coating is applied in a pattern that covers selected areas of a membrane's surface.

5. The structure of claim 3 wherein the conductive coating is itself coated with one or more layers of dielectric material.

6. The structure of claim 1 wherein the structure further comprises one or more spacers between the membranes wherein no spacer blocks a hole.

7. The structure of claim 1 further comprising a sensor that detects a change in the environment in which the structure is located.

8. The structure of claim 7 wherein the sensor detects a change in temperature, a change in humidity, or a change in the concentration of a selected chemical, biological or particulate species.

9. The structure of claim 1 further comprising a sensor that activates the actuating stimulus.

10. The structure of claim 1 wherein the actuating stimulus operates to a substantially uniform extent on all portions of the first membrane.

11. The structure of claim 1, which is impermeable to a selected human pathogen or toxin in its actuated state.

12. The structure of claim 1 further comprising one or more membranes in addition to the first and second membranes, and/or one or more layers of fabric.

13. The structure of claim 1 wherein at least one membrane comprises at least one polymer.

14. The structure of claim 1 wherein at least one membrane comprises at least one member of the group consisting of activated carbon, high surface silica, molecular sieves, xerogels, ion exchange materials, powdered metal oxides, powdered metal hydroxides, and antimicrobial agents.

15. An article of apparel comprising the adaptive membrane structure of claim 1.

16. The article of claim 15 which is selected from the group consisting of a protective suit, a protective covering, a hat, a hood, a mask, a gown, a coat, a jacket, a shirt, trousers, pants, a glove, a boot, a shoe and a sock.

17. The article of claim 15 which comprises one or more layers of fabric adjacent to one or both of the first and second membranes.

18. An enclosure for the occupancy of humans, animals or perishables comprising the adaptive membrane structure of claim 1.

19. The enclosure of claim 18 which is selected from the group consisting of a tent, a safe room, a clean room, a greenhouse, a dwelling, an office building and a storage container.

20. A valve for controlling the flow of gas, vapor, liquid and/or particulates comprising the adaptive membrane structure of claim 1.

* * * * *

UNITED STATES PATENT AND TRADEMARK OFFICE
CERTIFICATE OF CORRECTION

| | | |
|---|---|---|
| PATENT NO. | : 7,597,855 B2 | Page 1 of 1 |
| APPLICATION NO. | : 11/118961 | |
| DATED | : October 6, 2009 | |
| INVENTOR(S) | : Trentacosta et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1070 days.

Signed and Sealed this

Twenty-eighth Day of September, 2010

David J. Kappos
*Director of the United States Patent and Trademark Office*